United States Patent
Urtasun et al.

(10) Patent No.: US 12,198,358 B2
(45) Date of Patent: Jan. 14, 2025

(54) DEEP STRUCTURED SCENE FLOW FOR AUTONOMOUS DEVICES

(71) Applicant: Aurora Operations, Inc., Pittsburgh, PA (US)

(72) Inventors: Raquel Urtasun, Toronto (CA); Wei-Chiu Ma, Toronto (CA); Shenlong Wang, Toronto (CA); Yuwen Xiong, Toronto (CA); Rui Hu, Los Alamitos, CA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 0 days.

(21) Appl. No.: 17/962,624

(22) Filed: Oct. 10, 2022

(65) Prior Publication Data

US 2023/0038786 A1 Feb. 9, 2023

Related U.S. Application Data

(63) Continuation of application No. 16/531,720, filed on Aug. 5, 2019, now Pat. No. 11,468,575.

(Continued)

(51) Int. Cl.
*G06T 7/285* (2017.01)
*G06T 7/00* (2017.01)
(Continued)

(52) U.S. Cl.
CPC .............. *G06T 7/285* (2017.01); *G06T 7/246* (2017.01); *G06T 7/593* (2017.01); *G06T 7/97* (2017.01);
(Continued)

(58) Field of Classification Search
CPC ............ G06T 7/246; G06T 7/593; G06T 7/97; G06T 2207/10012; G06T 2207/10028;
(Continued)

(56) References Cited

U.S. PATENT DOCUMENTS 9,679,227 B2 6/2017 Taylor et al.
10,037,613 B1 * 7/2018 Becker .................... G06T 7/277
(Continued)

OTHER PUBLICATIONS

M. Menze, "Joint 3D estimation of Vehicles and scene flow" (Year: 2015).*

(Continued)

*Primary Examiner* — Dhaval V Patel
(74) *Attorney, Agent, or Firm* — Dority & Manning, P.A.

(57) ABSTRACT

Systems, methods, tangible non-transitory computer-readable media, and devices associated with motion flow estimation are provided. For example, scene data including representations of an environment over a first set of time intervals can be accessed. Extracted visual cues can be generated based on the representations and machine-learned feature extraction models. At least one of the machine-learned feature extraction models can be configured to generate a portion of the extracted visual cues based on a first set of the representations of the environment from a first perspective and a second set of the representations of the environment from a second perspective. The extracted visual cues can be encoded using energy functions. Three-dimensional motion estimates of object instances at time intervals subsequent to the first set of time intervals can be determined based on the energy functions and machine-learned inference models.

20 Claims, 10 Drawing Sheets

Related U.S. Application Data

(60) Provisional application No. 62/851,753, filed on May 23, 2019, provisional application No. 62/768,774, filed on Nov. 16, 2018.

(51) Int. Cl.
| | |
|---|---|
| *G06T 7/246* | (2017.01) |
| *G06T 7/593* | (2017.01) |
| *G06V 10/40* | (2022.01) |
| *G06V 10/82* | (2022.01) |
| *G06V 20/56* | (2022.01) |

(52) U.S. Cl.
CPC .............. *G06V 10/40* (2022.01); *G06V 10/82* (2022.01); *G06V 20/56* (2022.01); *G06T 2207/10012* (2013.01); *G06T 2207/10028* (2013.01); *G06T 2207/20081* (2013.01)

(58) Field of Classification Search
CPC ........... G06T 2207/20081; G06T 7/285; G06T 2207/20084; G06T 2207/30252; G06V 10/40; G06V 20/56
See application file for complete search history.

(56) References Cited

U.S. PATENT DOCUMENTS

| | | | | |
|---|---|---|---|---|
| 2017/0295360 | A1* | 10/2017 | Fu | H04N 13/398 |
| 2018/0157918 | A1 | 6/2018 | Levkova et al. | |
| 2018/0293454 | A1* | 10/2018 | Xu | G06V 20/49 |
| 2018/0293737 | A1 | 10/2018 | Sun et al. | |
| 2019/0004543 | A1* | 1/2019 | Kennedy | B64C 39/024 |
| 2019/0050000 | A1* | 2/2019 | Kennedy | G06V 20/17 |
| 2019/0066326 | A1 | 2/2019 | Tran et al. | |
| 2019/0096032 | A1* | 3/2019 | Li | G06T 3/4053 |
| 2019/0122381 | A1* | 4/2019 | Long | G06V 10/96 |
| 2019/0145765 | A1 | 5/2019 | Luo et al. | |
| 2019/0162856 | A1* | 5/2019 | Atalla | G01S 17/42 |
| 2021/0004682 | A1* | 1/2021 | Gong | G06N 3/08 |

OTHER PUBLICATIONS

Bai et al, Exploiting Semantic Information and Deep Matching for Optical Flow, arXiv:1604v2, Aug. 23, 2016, 16 pages.
Basha et al, "Multi-view Scene Flow Estimation: A View Centered Variational Approach", International Journal of Computer Vision, 2013, 16 pages.
Behl et al, "Bounding Boxes, Segmentations and Object Coordinates: How Important is Recognition for 3D Scene Flow Estimation in Autonomous Driving Scenarios?" International Conference on Computer Vision, Oct. 22-29, 2017, 10 pages.
Black et al, "The Robust Estimation of Multiple Motions: Parametric and Piecewise-Smooth Flow Fields", Computer Vision and Image Understanding, vol. 63, No. 1, Jan. 1996, pp. 75-104.
Boyd et al, "Convex Optimization", Cambridge University Press, Cambridge, Massachusetts, 2004, 713 pages.
Brox et al, "High Accuracy Optical Flow Estimation Based on a Theory for Warping" Conference on Computer Vision, May 11-14, 2004, Prague, Czech Republic, 13 pages.
Chang et al, "Pyramid Stereo Matching Network", arXiv:1803v1, Mar. 23, 2018, 9 pages.
Chen et al, "A Deep Visual Correspondence Embedding Model for Stereo Matching Costs", International Conference on Computer Vision, Dec. 7-13, 2016, Santiago, Chile, 9 pages.
Cordts et al, "The Cityscapes Dataset for Semantic Urban Scene Understanding", arXiv:1604v2, Apr. 7, 2016, 29 pages.
Fischer et al, "Flownet: Learning Optical Flow with Convolutional Networks", arXiv:1504v2, May 4, 2015, 13 pages.
Geiger et al, "Are We Ready for Autonomous Driving? The Kitti Vision Benchmark Suite", Conference on Computer Vision and Pattern Recognition, Jun. 18-20, 2012, Providence, Rhode Island, 8 pages.
He et al, "Mask R-CNN", arXiv:1703v3, Jan. 24, 2018, 12 pages.
He et al, "Spatial Pyramid Pooling in Deep Convolutional Networks for Visual Recognition", arXiv:1406v4, Apr. 23, 2015, 14 pages.
Hirschmuller, "Stereo Processing by Semiglobal Matching and Mutual Information", Transactions on Pattern Analysis and Machine Intelligence, vol. 30, Issue 2, Feb. 2008, 14 pages.
Hoff et al, "Surfaces from Stereo: Integrating Feature Matching, Disparity Estimation and Contour Detection", Transactions on Pattern Analysis and Machine Intelligence, vol. 11, No. 2, Feb. 1989, pp. 121-136.
Horn et al, "Determining Optical Flow", Artificial Intelligence, vol. 17, 1981, pp. 185-203.
Huguet et al, "A Variational Method for Scene Flow Estimation from Stereo Sequences", International Conference on Computer Vision, Oct. 14-20, 20117, Rio de Janeiro, 8 pages.
Hui et al, "Liteflownet: A Lightweight Convolutional Neural Network for Optical Flow Estimation", Jun. 19-21, 2018, Salt Lake City, Utah, pp. 8981-8989.
Ilg et al, "Flownet 2.0: Evolution of Optical Flow Estimation with Deep Networks", arXiv:1612v1, Dec. 6, 2016, 16 pages.
Kanade et al, "A Stereo Matching Algorithm with an Adaptive Window: Theory and Experiment", Technical Report, School of Computer Science, Carnegie Mellon University, Pittsburgh, Pennsylvania, 1990, 30 pages.
Kendall et al, "End-to-End Learning of Geometry and Context for Deep Stereo Regression", arXiv:1703v1, Mar. 13, 2017, 10 pages.
Luo et al, "Efficient Deep Learning for Stereo Matching", Conference on Computer Vision and Pattern Recognition, Jun. 26-Jul. 1, 2016, Las Vegas, Nevada, 9 pages.
Lv et al, "A Continuous Optimization Approach for Efficient and Accurate Scene Flow", arXiv:1607v1, Jul. 27, 2016, 16 pages.
Mayer et al, "A Large Dataset to Train Convolutional Networks for Disparity, Optical Flow, and Scene Flow Estimation", arXiv:1512v1, Dec. 7, 2015, 14 pages.
Menze et al, "Object Scene Flow for Autonomous Vehicles", Conference on Computer Vision and Pattern Recognition, Jun. 8-10, 2015, Boston, Massachusetts, 10 pages.
Neoral et al, "Object Scene Flow with Temporal Consistency", Computer Vision Winter Workshop, Feb. 6-8, 2017, Retz, Austria, 9 pages.
Newell et al, "Stacked Hourglass Networks for Human Pose Estimation", arXiv:1603v2, Jul. 26, 2016, 17 pages.
Papenberg et al, "Highly Accurate Optic Flow Computation with Theoretically Justified Warping", International Journal of Computer Vision, 2006, 18 pages.
Pons et al, "Multi-View Stereo Reconstruction and Scene Flow Estimation with a Global Image-Based Matching Score", International Journal of Computer Vision, 2007, 6 pages.
Ranjan et al, "Optical Flow Estimation Using a Spatial Pyramid Network", arXiv:1611v2, Nov. 21, 2016, 10 pages.
Ren et al, "Faster R-CNN: Towards Real-Time Object Detection with Region Proposal Networks", arXiv:1506v3, Jan. 6, 2016, 14 pages.
Revaud et al, "EpicFlow: Edge-Preserving Interpolation of Correspondences for Optical Flow", arXiv:1501v2, May 19, 2015, 11 pages.
Sun et al, "Models Matter, so Does Training: An Empirical Study of CNNs for Optical Flow Estimation", arXiv:1809v1, Sep. 14, 2018, 15 pages.
Sun et al, "PWC-Net: CNNs for Optical Flow Using Pyramid, Warping, and Cost Volume", arXiv:1709v3, Jun. 25, 2018, 18 pages.
Sun et al, "Secrets of Optical Flow Estimation and Their Principles", Conference on Computer Vision and Pattern Recognition, Jun. 13-18, 2010, San Francisco, California, 8 pages.
Valgaerts et al, "Joint Estimation of Motion, Structure and Geometry from Stereo Sequences", Conference on Computer Vision, Sep. 5-10, 2010, Crete, Greece, 14 pages.

(56) References Cited

OTHER PUBLICATIONS

Vedula et al, "Three-Dimensional Scene Flow", International Conference on Computer Vision, Sep. 20-27, 1999, Corfu, Greece, 8 pages.
Vogel et al, "3D Scene Flow Estimation with a Piecewise Rigid Scene Model", International Journal of Computer Science, vol. 111, No. 3, 2013, 27 pages.
Vogel et al, "Piecewise Rigid Scene Flow", International Conference on Computer Vision, Dec. 3-6, 2013, Sydney, Australia, 8 pages.
Wang et al, "Autoscaler: Scale-Attention Networks for Visual Correspondence", arXiv:1611v1, Nov. 17, 2016, 10 pages.
Yamaguchi et al, "Efficient Joint Segmentation, Occlusion Labeling, Stereo and Flow Estimation", Conference on Computer Vision, Sep. 6-12, 2014, Zurich, Switzerland, 16 pages.
Zagoruyko et al, "Learning to Compare Image Patches via Convolutional Neural Networks", arXiv:1504v1, Apr. 14, 2015, 9 pages.
Zbontar et al, "Computing the Stereo Matching Cost with a Convolutional Neural Network", arXiv:1409v2, Oct. 20, 2015, 8 pages.
Zbontar et al, "Stereo Matching by Training a Convolutional Neural Network to Compare Image Patches", arXiv:1510v2, May 18, 2016, 32 pages.
Zhao et al, "Pyramid Scene Parsing Network", arXiv:1612v2, Apr. 27, 2017, 11 pages.

\* cited by examiner

MACHINE-LEARNED SCENE FLOW MODEL 1100

PLURALITY OF MACHINE-LEARNED FEATURE EXTRACTION MODELS 1110

ONE OR MORE MACHINE-LEARNED SEGMENTATION MODELS 1120

ONE OR MORE MACHINE-LEARNED STEREO MATCHING MODELS 1130

ONE OR MORE MACHINE-LEARNED OPTICAL FLOW MODELS 1140

ONE OR MORE MACHINE-LEARNED INFERENCE MODELS 1150

PHOTOMETRIC ERROR ENERGY FORMULATION MODEL 1160

RIGID FITTING ENERGY MODEL 1170

FLOW CONSISTENCY ENERGY MODEL 1180

GAUSSIAN-NEWTON SOLVER 1190

FIG. 11

DEEP STRUCTURED SCENE FLOW FOR AUTONOMOUS DEVICES

RELATED APPLICATION

The present application is based on and claims benefit of U.S. Provisional Patent Application No. 62/768,774 having a filing date of Nov. 16, 2018; and U.S. Provisional Patent Application No. 62/851,753 having a filing date of May 23, 2019, which are incorporated by reference herein.

FIELD

The present disclosure relates generally to operation of a motion flow estimation system that uses a machine-learned model to estimate three-dimensional motion flow.

BACKGROUND

Vehicles, including autonomous vehicles, can receive data that is used to determine the state of an environment through which the vehicle travels. This data can include various representations of the environment. As the state of objects in the environment is dynamic, and the set of objects in the environment can change over time, safe operation of a vehicle may depend on an accurate determination of the state of the representation of the environment over time.

SUMMARY

Aspects and advantages of embodiments of the present disclosure will be set forth in part in the following description, or may be learned from the description, or may be learned through practice of the embodiments.

An example aspect of the present disclosure is directed to a computer-implemented method of estimating three-dimensional motion flow. The computer-implemented method can include accessing, by a computing system including one or more computing devices, scene data including a plurality of representations of an environment over a first set of time intervals. The computer-implemented method can include generating, by the computing system, a plurality of extracted visual cues based at least in part on the plurality of representations and a plurality of machine-learned feature extraction models. At least one of the plurality of machine-learned feature extraction models can be configured to generate a portion of the plurality of extracted visual cues based at least in part on a first set of the plurality of representations of the environment from a first perspective and a second set of the plurality of representations of the environment from a second perspective. The computer-implemented method can include encoding, by the computing system, the plurality of extracted visual cues using a plurality of energy functions. The computer-implemented method can include determining, by the computing system, one or more three-dimensional motion estimates of one or more object instances over a second set of time intervals based at least in part on the plurality of energy functions and one or more machine-learned inference models. Further, the second set of time intervals can be subsequent to the first set of time intervals.

Another example aspect of the present disclosure is directed to one or more tangible non-transitory computer-readable media storing computer-readable instructions that when executed by one or more processors cause the one or more processors to perform operations. The operations can include accessing training data including a plurality of representations of an environment over a first set of time intervals. The plurality of representations can include a first plurality of representations of the environment from a first perspective and a second plurality of representations from a second perspective. The operations can include generating a plurality of extracted visual cues based at least in part on the plurality of representations and a plurality of machine-learned feature extraction models. The operations can include encoding the plurality of visual cues using a plurality of energy functions. The operations can include determining one or more three-dimensional motion estimates of one or more object instances over a second set of time intervals based at least in part on the plurality of energy functions and one or more machine-learned inference models. The second set of time intervals can be subsequent to the first set of time intervals. The operations can include determining a loss associated with one or more comparisons of the one or more three-dimensional motion estimates of the one or more object instances relative to one or more ground-truth locations of the one or more object instances. Furthermore, the operations can include adjusting one or more parameters of the plurality of machine-learned feature extraction models based at least in part on the loss.

Another example aspect of the present disclosure is directed to a computing system including: one or more processors; one or more tangible non-transitory computer readable media that store a machine-learned scene flow model. The machine-learned scene flow model can include a plurality of machine-learned feature extraction models configured to generate one or more estimates based at least in part on a plurality of representations of an environment. The one or more estimates can include object instance segment estimates, one or more optical flow motion estimates, and one or more stereo motion estimates. Furthermore, the machine-learned scene flow model can include one or more machine-learned inference models configured to generate one or more three-dimensional motion estimates based at least in part on minimization of energy associated with the plurality of representations. The one or more machine-learned inference models can be configured to minimize energies including an energy associated with photometric error based at least in part on a similarity of the plurality of representations over time, an energy associated with rigid motion based at least in part on one or more differences between one or more optical flow motion estimates and the one or more stereo motion estimates, and an energy associated with flow consistency of the one more two-dimensional rigid flow estimates with respect to the one or more optical flow motion estimates.

Other example aspects of the present disclosure are directed to other systems, methods, vehicles, apparatuses, tangible non-transitory computer-readable media, and devices for estimating three-dimensional motion flow.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 11 depicts a diagram of examples of machine-learned feature-extraction models and machine-learned inference models according to example embodiments of the present disclosure;

DETAILED DESCRIPTION

Figure 1:
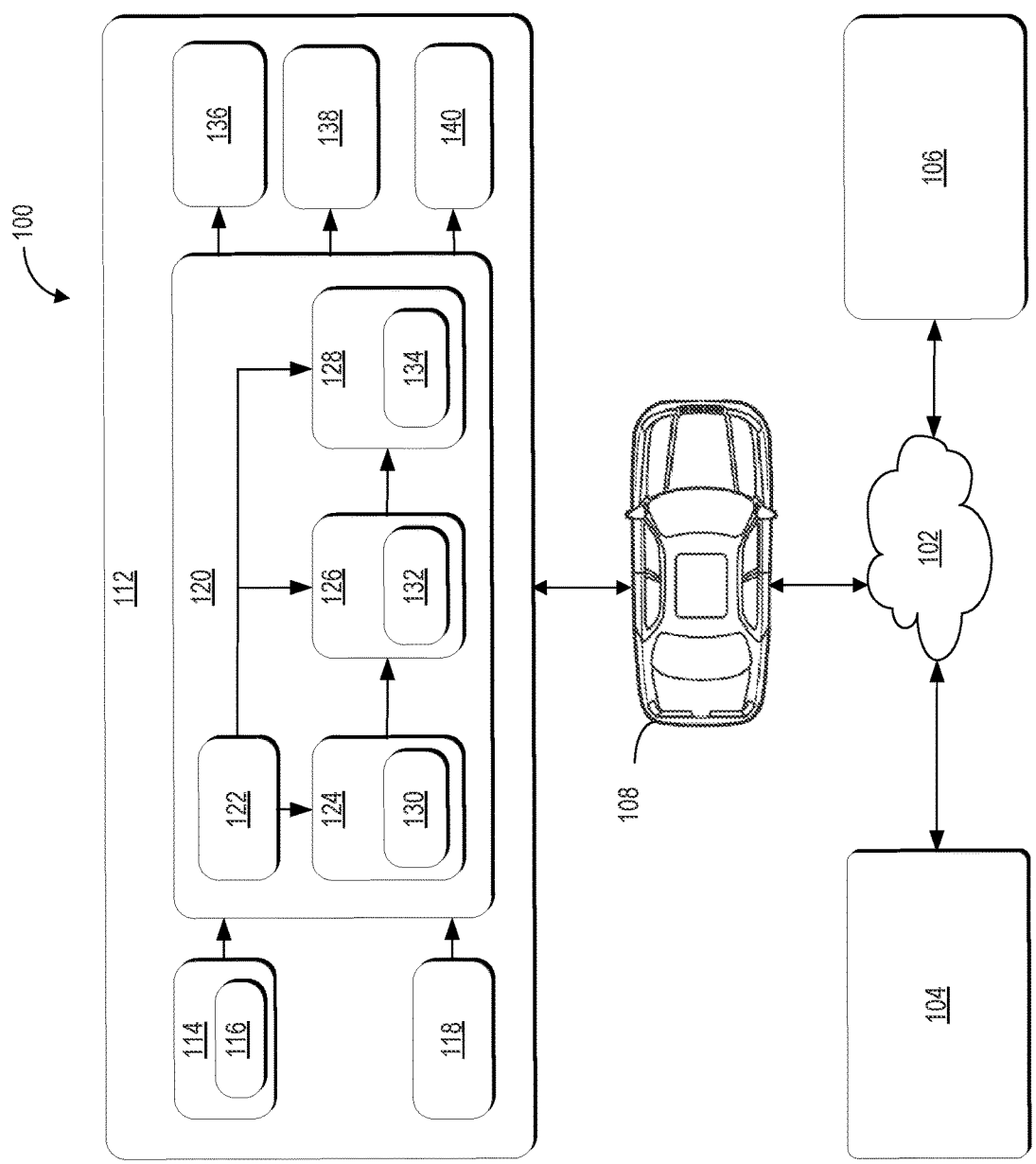
FIG. 1 depicts a diagram of an example system according to example embodiments of the present disclosure.

Example aspects of the present disclosure are directed to estimating the motion flow of objects. In particular, the disclosed technology can estimate the motion flow of objects through use of machine-learned models that have been trained using stereo representations of an environment over multiple time intervals.

The disclosed technology can be implemented by a variety of computing systems that are configured to estimate the motion flow of objects. In particular, the disclosed technology can be used as part of a computing system that more accurately estimates the motion flow of objects in the environment around an autonomous vehicle, thereby allowing for improved determination of the state of the environment around the autonomous vehicle. Furthermore, the disclosed technology can include an association computing system that is associated with an autonomy system of an autonomous vehicle that includes a perception system, a prediction system, and/or a motion planning system. For example, the association computing system can receive stereo images of an environment from a set of cameras associated with an autonomous vehicle. The association computing system can then use the set of stereo images as an input for an included machine-learned model that is trained to determine motion flow of objects depicted in the set of stereo images. By determining the motion flow of the depicted objects, the association computing system can provide improved estimates of the future locations of the objects which can then be used by various systems of an autonomous vehicle.

By way of further example, aspects of the present disclosure can include accessing scene data that includes stereo representations of an environment captured over successive time intervals. For example, the stereo representations of the environment can include a left image and a right image of the same environment captured from different perspectives. Visual cues can then be generated using machine-learned feature extraction models that are trained to determine visual cues in the stereo representations. For example, the visual cues can include instance segmentation, stereo matching, and optical flow cues associated with the stereo representations. The extracted visual cues can then be encoded using energy functions. Furthermore, a machine-learned inference model can be used to determine an estimated motion flow that includes three-dimensional motion estimates of object instances in the stereo representations over time intervals subsequent to the time intervals during which the stereo representations were initially captured. In some embodiments, the estimated motion flow can include three-dimensional motion flow of the object instances. Accordingly, aspects of the present disclosure can be used for a variety of tasks associated with estimating the motion flow of object instances including vehicle motion planning and the coordination of movements of devices in a dynamic environment.

By more effectively estimating motion flow, the disclosed technology allows for various improvements including a number of safety improvements resulting from more accurate motion flow estimation, less wear and tear on vehicle components due to fewer course corrections, and more efficient use of computational resources resulting from the use of highly efficient machine-learned models.

The computing system can access scene data that can include a plurality of representations of an environment over a first set of time intervals. In some embodiments, the plurality of representations can include a first plurality of representations of the environment from a first perspective and a second plurality of representations of the environment from a second perspective. For example, the first plurality of representations and the second plurality of representations respectively can correspond to a first plurality of stereo images from a first perspective and a second plurality of stereo images from a second perspective that is different from the first perspective.

The computing system can generate a plurality of extracted visual cues based at least in part on the plurality of representations and plurality of machine-learned feature extraction models. In some embodiments, the plurality of machine-learned feature extraction models can be configured and/or trained to extract one or more visual cues from the plurality of representations. Further, the plurality of visual cues can include one or more instance segmentation cues, one or more optical flow cues, and/or one or more stereo cues.

For example, the computing system can use the plurality of machine-learned feature extraction models to generate a flow representation of the plurality of representations, a segmented representation of the plurality of representations, and a stereo representation of the plurality of representations.

In some embodiments, at least one of the plurality of machine-learned feature extraction models is configured to generate a portion of the plurality of extracted visual cues based at least in part on the first set of the plurality of representations of the environment from the first perspective and the second set of the plurality of representations of the environment from the second perspective. For example, the plurality of feature extraction models can include a machine-learned stereo matching model that can generate a portion of the plurality of extracted visual cues that includes stereo representations based at least in part on the first set of the plurality of representations and the second set of the plurality of representations.

The computing system can encode the extracted visual cues using a plurality of energy functions. The energy functions may also be referred to as energy formulations. For example, the computing system can encode the visual cues as a photometric error energy, a rigid motion energy, and/or a flow consistency energy.

The computing system can determine an estimated motion flow based at least in part on the plurality of energy functions and one or more machine-learned inference models. The estimated motion flow can include one or more three-dimensional motion estimates of one or more object instances over a second set of time intervals subsequent to the first set of time intervals. The one or more object instances can, for example, be based at least in part on one or more segments of the plurality of representations. Further, the one or more machine-learned inference models can be configured and/or trained to determine the one or more three-dimensional motion estimates of the one or more object instances based at least in part on stereo and flow estimates derived from changes in the locations of the one or more object instances over preceding time intervals.

In some embodiments, the plurality of machine-learned feature extraction models can include a machine-learned segmentation model configured and/or trained to generate and/or determine the portion of the plurality of extracted visual cues including one or more object instance segments associated with the plurality of representations. For example, the machine-learned segmentation model can determine edges that are associated with various object instances in an environment including vehicles, buildings, and pedestrians.

In some embodiments, generating the plurality of extracted visual cues can include generating and/or determining one or more object instance proposals associated with the plurality of representations, determining an object class for each of the one or more object instance proposals, and/or determining a background-foreground segmentation mask for each of the one or more object instance proposals. For example, the computing system can determine an object instance proposal based on detected edges of the object instance, determine that the object instance is a vehicle, and determine that the vehicle is a moving object and therefore is part of the foreground. By way of further example, the computing system can determine an object instance proposal based on detected edges of the object instance, determine that the object instance is a road surface, and determine that the road surface is a static object and therefore part of the background.

In some embodiments, the plurality of machine-learned feature extraction models can include a machine-learned stereo matching model configured and/or trained to generate and/or determine the portion of the plurality of extracted visual cues including one or more depth estimates associated with the plurality of representations. For example, the computing system can use the machine-learned stereo matching model to estimate one or more distances between the one or more object instances in the plurality of representations based at least in part on one or more comparisons of the first plurality of representations to the second plurality of representations.

In some embodiments, generating the plurality of extracted visual cues can include generating a feature map based at least in part on the plurality of representations, determining a cost volume of the feature map based at least in part on an aggregation of context in different scales and different locations of the feature map, and determining one or more depth estimates for the plurality of representations based at least in part on aggregation of the cost volume. For example, the computing system can determine a depth estimate for a smaller portion of a representation based at least in part on context associated with the entire representation that the smaller portion is a part of.

In some embodiments, the plurality of machine-learned feature extraction models can include a machine-learned optical flow model trained to generate and/or determine the portion of the plurality of extracted visual cues including an optical flow associated with the plurality of representations. For example, the machine-learned optical flow models can determine the direction in which one or more object instances in the plurality of representations are moving over the first set of time intervals. In some embodiments, the optical flow can be based at least in part on the motion of objects over some set of time intervals. For example, the optical flow can be based at least in part on the determined motion of object instances associated with objects depicted in a plurality of representations of an environment over a set of time intervals (e.g., a set of ten time intervals with a duration of a tenth of a second each). The optical flow can be associated with one or more changes over time in the appearance of an image resulting from the apparent motion of one or more objects, surfaces, edges, and/or brightness patterns in the image. Further, in some embodiments, the optical flow can be determined over multiple cycles of a motion prediction process using the machine-learned optical flow models and based at least in part optical data which can be used as an input to the machine-learned optical flow model and can include the plurality of extracted visual cues.

In some embodiments, the machine-learned optical flow model can generate extracted visual cues that can include one or more features of the plurality of representations associated with and/or encoded with a large context. The machine-learned optical flow model can warp the one or more features of the plurality of representations associated with and/or encoded with a large context based at least in part on a coarse to fine scheme, and sharpen one or more boundaries of the one or more features. For example, the computing system can generate the plurality of extracted visual cues by determining one or more features of the plurality of representations that are relatively larger in size, warping the one or more features by stretching or compressing the one or more features, and applying a sharpening operation to the edges of the one or more features.

In some embodiments, the coarse to fine scheme can include determining one or more visual features of the one or more features of the plurality of representations associated with and/or encoded with a large context based at least in part on a size of each visual feature of the one or more visual features. Further, the one or more visual features that are relatively larger can be progressively warped before the one or more visual features that are relatively smaller. For example, the computing system can warp coarse features including the outline of a vehicle before warping fine features including door handles of the same vehicle.

In some embodiments, the machine-learned models of the disclosed technology can be trained based on evaluation of a loss function that is associated with training data. In particular, a computing system can access training data that includes stereo representations including images captured over successive time intervals. Further, the stereo representations can be associated with ground-truth locations of object instances in the stereo representations over the successive time intervals. The computing system can then use multiple machine-learned feature extraction models to generate extracted visual cues which are in turn used to determine three-dimensional motion estimates of object instances. The computing system can determine losses for the machine-learned feature extraction models. By way of example, a loss can be based on evaluation of a loss function associated with the accuracy of the three-dimensional motion estimates of the object instances relative to ground-truth locations of the object instances.

After each successive iteration of performing operations on the training data and determining the loss, the computing system can adjust parameters of each of the machine-learned feature extraction models based on the loss. For example, the computing system can individually adjust parameters of each of the machine-learned feature extraction models including a machine-learned segmentation model, a machine-learned optical flow model, and/or a machine-learned stereo matching model. Furthermore, parameters of each of the machine-learned feature extraction models can be weighted in proportion to their contribution to decreasing the loss so that parameters that contribute more to reducing the loss are weighted more heavily. As such, the computing system can generate more effective machine-learned models that can be used to more accurately determine motion flow for object instances in an environment.

Furthermore, the computing system can access one or more machine-learned models that have been at least partly generated and/or trained using training data indicative of a plurality of objects. The objects can include various vehicles including automobiles, motorcycles, and/or buses. The vehicles can have a plurality of features including physical dimensions, shapes, and/or other visual cues that are associated with a respective plurality of classified object labels. In some embodiments, the plurality of features can be extracted from training data that includes a plurality of images associated with one or more sensor outputs from one or more sensors that detect the plurality of objects. The plurality of images can include stereo images of the same environment captured from different perspectives. When the one or more machine-learned models have been trained, the one or more machine-learned models can associate some of the plurality of features with one or more of the plurality of classified object labels that are used to classify and/or categorize objects including objects that are not included in the plurality of objects. For example, the machine-learned models can segment and/or classify objects instances in images.

In some embodiments, as part of the training process, differences in a classification output between a machine-learned model that outputs the one or more classified object labels and one or more ground-truth labels associated with a plurality of objects can be processed using an error loss function that can determine a set of probability distributions based on repeated classification of the same plurality of objects. As such, the accuracy of the machine-learned model, which can be based at least in part on a proportion of correctly identified objects, can be improved over time.

The computing system can access the machine-learned model in various ways. The computing system can access data and/or information associated with one or more machine-learned models stored on a remote computing device. The remote computing device can be accessed via a wired and/or wireless network connection. Further, the computing system can access one or more machine-learned models that are stored locally. For example, the one or more machine-learned models can be locally stored on one or more local storage devices of the remote computing device.

Furthermore, the plurality of features can be associated with one or more values that can be analyzed individually and/or in various combinations. The analysis of the one or more values associated with the plurality of classified features can include determining a mean, mode, median, variance, standard deviation, maximum, minimum, and/or frequency of the one or more values associated with the plurality of features. Further, analysis of the one or more values associated with the plurality of features can include comparisons of the differences or similarities between the one or more values.

In some embodiments, the plurality of features classified by the one or more machine-learned models can include: a range of physical dimensions associated with the plurality of objects (e.g., an object's length, width, and/or height); a range of colors associated with the plurality of objects (e.g., RGB values); and/or a range of shapes associated with the plurality of objects. Further, the plurality of features classified by the one or more machine-learned models can be based at least in part on one or more sensor outputs from one or more sensors that have captured the plurality of objects from various angles and/or distances in different environments. The different environments can include urban areas, suburban areas, rural areas, heavy traffic, and/or light traffic and can include different environmental conditions including bright daylight, rainy days, darkness, snow covered roads, the interior of buildings, and/or lighting conditions caused by artificial lighting. The one or more classified object labels can then be used to classify and/or categorize the one or more objects, including one or more vehicles including automobiles, buses, motorcycles, bicycles, scooters, and/or mopeds; buildings; roads including streets and highways; road markings include lane markings and crosswalk markings; sidewalks; bridges and overpasses; waterways including rivers and canals; pedestrians and/or cyclists; trees and other foliage; and/or natural geographic formations. The plurality of objects can include one or more actual objects or simulated objects that are used to train any of the machine-learned models.

As part of training the plurality of machine-learned feature extraction models, the computing system can access training data that includes a plurality of representations of an environment over a first set of time intervals. In some embodiments, the plurality of representations can include a first plurality of representations of the environment from a first perspective and a second plurality of representations from a second perspective. The computing system can generate a plurality of extracted visual cues based at least in part on the plurality of representations in the training data and plurality of machine-learned feature extraction models. The computing system can encode the plurality of extracted visual cues using a plurality of energy functions. The computing system can determine one or more three-dimensional motion estimates of one or more object instances occur over a second set of time intervals subsequent to the first set of time intervals based at least in part on the plurality of energy functions and one or more machine-learned inference models.

As part of training the plurality of machine-learned feature extraction models, the computing system can determine a loss associated with one or more comparisons of the one or more three-dimensional motion estimates of the one or more object instances relative to one or more ground-truth locations of the one or more object instances. The loss can be determined based at least in part on the evaluation of one or more loss functions that are different, and which in some embodiments can have different weighting contributions to the loss. The loss function can include various loss constituent functions that are used to maximize the accuracy of the three-dimensional motion estimates of the object instances with respect to the ground-truth locations of the object instances. Accordingly, the accuracy of the three-dimensional motion estimates of the object instances is positively correlated with their similarity to the ground-truth position. In some embodiments, the plurality of machine-learned models can be trained end-to-end. For example, various combinations of the plurality of machine-learned models including the machine-learned segmentation model, the machine-learned stereo matching model, and/or the machine-learned optical flow model can be trained end-to-end. Furthermore, in some embodiments, the plurality of machine-learned feature extraction models can be trained based at least in part on minimization of a region of interest classification loss, a box regression loss, and/or a mask segmentation loss. For example, the machine-learned segmentation model can be pre-trained using a ground-truth database including images of geographic areas and the machine-learned segmentation model can be fine-tuned using one or more vision benchmarking suites. Additionally, the machine-learned stereo-matching model and the machine-learned optical flow model can be pre-trained using ground-truth scene flow and vision datasets and can be fine-tuned using an L1 (least absolute deviations) regression loss.

As part of training the plurality of machine-learned feature extraction models, the computing system can adjust one or more parameters of the plurality of machine-learned feature extraction models based at least in part on the loss. For example, the one or more parameters of the plurality of machine-learned feature extraction models that do not change the loss (e.g., cause the loss to increase or decrease) may be kept the same (e.g., not adjusted), the one or more parameters that decrease the loss can be weighted more heavily (e.g., adjusted to increase their contribution to the loss), and the one or more parameters that increase the loss can have their weighting reduced (e.g., adjusted to reduce their contribution to the loss). Accordingly, adjustment of the one or more parameters of the plurality of machine-learned feature extraction models over a plurality of iterations can result in a lower loss that can correspond to more accurate three-dimensional motion estimates of the one or more object instances relative to the ground-truth locations of the one or more object instances.

In some embodiments, generating the plurality of extracted visual cues can include determining one or more portions of the plurality of representations that are occluded based at least in part on a disparity between a representation of the plurality of representations at an initial time interval and the representation at a time interval subsequent to the initial time interval. For example, the computing system can determine one or more portions of a representation in an initial time interval that are occluded due to a change in the viewpoint, thereby obfuscating some portion of the representation in a subsequent time interval. Further, generating the plurality of extracted visual cues can include determining that the one or more portions of the plurality of representations that are occluded are excluded from the plurality of extracted visual cues. For example, the one or more portions of the plurality of representations that are occluded can be marked or labeled as occluded, which can result in those portions being excluded from inclusion in the plurality of extracted visual cues.

In some embodiments, each representation of the plurality of representations can include a plurality of pixels. For example, the plurality of representations can include one or more images, each of which can be a raster or vector image. Further, the disparity between the representations at the initial time interval and the time interval subsequent to the initial time interval can based at least in part on one or more differences between the plurality of pixels of the representation of the plurality of representations at the initial time interval and the representation at the time interval subsequent to the initial time interval. For example, the one or more differences can include differences in the intensity of pixel values that can be compared to a threshold value that is used to determine if the disparity is sufficient for the respective pixels to be excluded.

In some embodiments, determining the one or more three-dimensional motion estimates can include determining an energy associated with a photometric error based at least in part on one or more comparisons of one or more portions of each of the plurality of representations at an initial time interval to one or more portions of each of the plurality of representations at a time interval subsequent to the initial time interval. For example, the computing system can determine photometric error based at least in part on analysis of differences between overlapping or non-overlapping patches of the plurality of representations at different time intervals.

In some embodiments, determining the one or more three-dimensional motion estimates can include determining an energy associated with rigid motion error based at least in part on similarity of one or more optical flow motion estimates of the one or more object instances to one or more stereo motion estimates of the one or more object instances. The energy can be negatively correlated with similarity. For example, lower similarity of the one or more optical flow motion estimates of the one or more object instances to one or more stereo motion estimates of the one or more object instances can result in less minimization of the energy associated with rigid motion error.

In some embodiments, determining the one or more three-dimensional motion estimates can include determining an energy associated with flow consistency based at least in part on a two-dimensional rigid flow and an optical flow associated with the plurality of visual cues. For example, the computing system can determine a projection of the three-dimensional motion of the one or more object instances that are most similar to an estimated flow associated with the one or more three-dimensional motion estimates of the one or more object instances. In some embodiments, the flow consistency can be associated with the similarities and/or differences between two-dimensional rigid flow and optical flow. The flow consistency can be an indication of a consistency of the motion of an object as determined over multiple cycles of a motion prediction process.

In some embodiments, determining the energy can include minimizing the energy based at least in part on a weighted combination of photometric error, rigid fitting, and flow consistency associated with the plurality of representations. For example, the computing system can determine the energy by determining the rigid three-dimensional motion of the one or more object instances that minimizes the weighted combination of photometric error, rigid fitting, and/or flow consistency.

In some embodiments, minimizing the energy can be based at least in part on performing one or more operations associated with a Gaussian-Newton solver. For example, the computing system can minimize the energy by performing one or more operations to iteratively minimize a least-squared function associated with rigid motion of the one or more object instances over the first set of time intervals.

In some embodiments, the computing system can determine a motion plan for a vehicle based at least in part on the one or more three-dimensional motion estimates of the one or more objects. The motion plan can include one or more locations for the vehicle that do not traverse the one or more three-dimensional motion estimates of the one or more objects. For example, the one or more three-dimensional motion estimates of the one or more object instances can be used as an input for a vehicle motion planning system that can navigate the vehicle around the location of objects determined based at least in part on the one or more three-dimensional motion estimates.

In some embodiments, the computing system can include a machine-learned scene flow model that includes a plurality of machine-learned feature extraction models, a plurality of energy formulation models, and one or more inference models. The plurality of machine-learned feature extraction models can be configured to generate one or more estimates based at least in part on the plurality of representations of the environment. The one or more estimates can include the one or more object instance segment estimates, the one or more optical flow motion estimates, and/or the one or more stereo motion estimates.

Furthermore, one or more machine-learned inference models can be configured to generate one or more three-dimensional motion estimates based at least in part on minimization of energies associated with a plurality of energy models. The plurality of energy models can include one or more photometric energy models configured to minimize energy associated with photometric error based at least in part on a similarity of the plurality of representations over time. Further, the plurality of energy models can include one or more rigid motion models configured to minimize energy associated with rigid motion based at least in part on one or more differences between the one or more optical flow motion estimates and the one or more stereo motion estimates. The plurality of energy models can include one or more flow consistency models configured to minimize energy associated with flow consistency of the one more two-dimensional rigid flow estimates with respect to the one or more optical flow motion estimates. In some embodiments, the one or more machine-learned inference models can include a machine-learned model configured and/or trained to minimize the energies based at least in part on one or more operations associated with the Gaussian-Newton solver.

In some embodiments, the one or more segmentation models can be configured to generate the one or more object instance segment estimates based at least in part on a first plurality of representations of an environment. The one or more optical flow models can be configured to generate the one or more optical flow motion estimates based at least in part on the first plurality of representations of the environment. The one or more stereo matching models can be configured to generate the one or more stereo motion estimates based at least in part on the first plurality of representations of the environment and a second plurality of representations of the environment from a second perspective.

A computing system according to the disclosed technology can include one or more computing devices that can perform one or more operations. The operations can include controlling a variety of other systems and/or components including machine-learning systems, vehicle systems, augmented reality systems, and/or robotic systems. In some embodiments, the system can include one or more computing devices associated with one or more processors and one or more memory storage devices. Further, the computing system can process, generate, access, send, and/or receive, one or more signals and/or data, including signals and/or data exchanged with various locally accessible computing systems, vehicle systems, vehicles, or remote computing systems. Furthermore, the computing systems and/or computing devices described herein can access information and/or data by obtaining and/or retrieving the data and/or information (e.g., actively accessing data) from another computing system or computing device; and/or receiving, being sent, and/or being provided with data and/or information (e.g., passively accessing data) from another computing system and/or computing device. Further, the computing systems and/or computing devices described herein can access data and/or information by sending and/or receiving one or more signals which can include electronic signals encoded with data and/or information.

In some embodiments, the computing system (e.g., a vehicle computing system for controlling a vehicle) can include a variety of sub-systems and components. For example, the computing system can send and/or receive one or more signals including electronic signals and/or data to or from one or more vehicle systems including one or more sensor systems that can generate one or more outputs based on detection of changes in the state of the physical environment external to the vehicle including light detection and ranging (LiDAR) devices, cameras, microphones, radar devices, thermal sensors, and/or sonar devices.

Further, the computing system can send and/or receive one or more signals and/or data to one or more communication systems including wired and/or wireless communication systems that can exchange signals and/or data with other devices. The computing system can send and/or receive one or more signals to navigation systems that can include one or more devices that can receive signals from GPS, GLONASS, or other systems used to determine a computing system's geographical location.

In some embodiments, the computing system can also send and/or receive one or more signals to autonomous vehicle systems including perception systems that can include one or more systems used to determine the state of the environment surrounding a vehicle; and/or motion planning systems that can include one or more systems used to determine a travel path for a vehicle.

The computing system can send and/or receive notification systems including devices used to provide notifications to other computing systems and/or pedestrians, and which can include display devices, status indicator lights, and/or audio output devices. Furthermore, the computing system can send and/or receive one or more signals to various vehicle systems used to control the movement of a vehicle including braking systems used to slow down a vehicle including mechanical and/or electric brakes; propulsion systems used to provide power for the vehicle to move from one location to another which can include motors and/or engines including electric engines and/or internal combustion engines; and/or steering systems used to change the path, course, and/or direction of travel of a vehicle.

By way of further example, the computing system, which can include a robotic computing system, can send and/or receive one or more signals including electronic signals and/or data to and/or from one or more robotic systems and/or robotic components associated with a robotic device. For example, the computing system can send one or more control signals that are used to control the movements of a robotic device that includes a robotic arm that is used to interact with one or more users based at least in part on the estimated motion flow of the movements of the one or more users.

By way of further example, the computing system, which can include an augmented reality system, can send and/or receive one or more signals including electronic signals and/or data to and/or from one or more augmented reality systems and/or augmented reality components which can include a head-mounted augmented reality display component. For example, the computing system can estimate motion flow for an augmented reality game in which the motion flow of a physical object such as a ball can be used to generate one or more associated images that are displayed on an augmented reality head-mounted display.

The systems, methods, devices, and non-transitory computer-readable media in the disclosed technology can provide a variety of technical effects and benefits including improving the estimation of motion flow in general and improving the overall operation of a vehicle that uses estimated three-dimensional motion flow information for navigation in particular. By more effectively estimating motion flow for object instances over time through use of one or more machine-learned models, the disclosed technology can provide various benefits including more accurate motion flow estimation, improved scalability, reduced wear and tear on a vehicle, greater fuel efficiency, improved safety, and an overall improvement in the utilization of computational resources that results from a more efficient estimation of motion flow.

The disclosed technology can achieve more accurate and/or faster estimation of motion flow by leveraging the use of one or more machine-learned models including machine-learned feature extraction models and machine-learned inference models. Further, the one or more machine-learned models can be trained to estimate motion flow based on visual cues and the use of a Gaussian-Newton solver that can more rapidly minimize energy associated with motion flow for object instances. Accordingly, the disclosed technology can more effectively utilize computational resources by reducing the number of operations that need to be performed to accurately estimate motion flow for a scene.

Furthermore, by using the one or more machine-learned models, the disclosed technology has the additional advantage of improved scalability. In particular, a machine-learned model that can be retrained using an additional set of training data can be improved without the laborious manual derivations and adjustments that are often required in rules-based models or heuristic models that do not use machine-learning. For example, in a manually derived rules based model, a human designer would need to manually derive heuristic models that determine the way in which motion flow can be estimated including manually weighting parameters associated with various visual cues. As such, the task of crafting and adjusting a heuristic model can be onerous relative to using a machine-learned model that is trained using training datasets. Further, the one or more machine-learned models in the disclosed technology can be trained using relevant training data including stereo images, which can be done on a large scale that can use millions of images. Additionally, the one or more machine-learned models can readily revised as new training data becomes available or new uses for the one or more machine-learned models are envisioned.

The disclosed technology can also improve the operation of a vehicle by reducing the amount of wear and tear on vehicle components through more gradual adjustments in the vehicle's travel path that can be performed based on the more accurate estimate of motion flow of objects in the environment surrounding the vehicle. For example, more accurate motion flow estimation can result in a more safe and smooth ride including a reduction in sudden stops that impose strain on a vehicle's engine, braking, and steering systems. Additionally, more accurate flow estimation can improve the comfort of a passenger when the vehicle is in transit due to smoother adjustments by the vehicle that result from more accurate motion flow estimation.

The disclosed technology can further improve the operation of a vehicle by improving the energy efficiency of the vehicle. For example, more accurate motion flow estimation can result in more efficient navigation of a vehicle through an environment, thereby reducing the number of fuel consuming course changes and achieving a reduction in the overall amount of energy including the fuel or battery power that is consumed when operating the vehicle.

Additionally, more effective flow estimation can allow for an improvement in safety for passengers inside a vehicle as well as individuals outside the vehicle including pedestrians, cyclists, and/or passengers of other vehicles. For example, the more accurate motion flow estimations generated by the disclosed technology can be used by an autonomous vehicle's motion planning system to more effectively avoid unintentional contact with objects outside the vehicle.

Further, the disclosed technology can be used by a variety of devices that use motion flow information including autonomous vehicles, robotic systems, and/or augmented reality systems. For example, highly accurate motion flow information can be used by robotic systems that need to determine the future location of moving objects in order to interact with those objects.

Accordingly, the disclosed technology provides a host of improvements to the estimation of motion flow including three-dimensional motion flow. Operational benefits of the disclosed technology include more accurate flow estimation, improved scalability, reduced wear and tear on a vehicle, greater energy efficiency, improved safety, and/or an overall improvement in the efficiency of utilizing computational resources.

With reference now to FIGS. 1-13, example embodiments of the present disclosure will be discussed in further detail. FIG. 1 depicts a diagram of an example system 100 according to example embodiments of the present disclosure. As illustrated, FIG. 1 shows a system 100 that includes a communications network 102; an operations computing system 104; one or more remote computing devices 106; a vehicle 108; a vehicle computing system 112; one or more sensors 114; sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; and a human-machine interface 140.

The operations computing system 104 can be associated with a service provider that can provide one or more services to a plurality of users via a fleet of vehicles that can include, for example, the vehicle 108. The vehicle services can include transportation services (e.g., rideshare services), courier services, delivery services, and/or other types of services.

The operations computing system 104 can include multiple components for performing various operations and functions. For example, the operations computing system 104 can include and/or otherwise be associated with the one or more computing devices that are remote from the vehicle 108. The one or more computing devices of the operations computing system 104 can include one or more processors and one or more memory devices. The one or more memory devices of the operations computing system 104 can store instructions that when executed by the one or more processors cause the one or more processors to perform one or more operations and/or functions including any of the operations and/or functions of the one or more remote computing devices 106 and/or the vehicle computing system 112. Furthermore, the operations computing system 104 can perform one or more operations and/or functions including accessing scene data including a plurality of representations of an environment over a first set of time intervals; generating a plurality of extracted visual cues based at least in part on the plurality of representations and a plurality of machine-learned feature extraction models; encoding the plurality of extracted visual cues using a plurality of energy functions; and determining one or more three-dimensional motion estimates of one or more object instances over a second set of time intervals subsequent to the first set of time intervals based at least in part on the plurality of energy functions and one or more machine-learned inference models.

In some embodiments, the one or more operations and/or functions performed by the operations computing system 104 can include accessing training data including a plurality of representations of an environment over a first set of time intervals; generating a plurality of extracted visual cues based at least in part on the plurality of representations and a plurality of machine-learned feature extraction models; encoding the plurality of extracted visual cues using a plurality of energy functions; determining one or more three-dimensional motion estimates of one or more object instances that are predicted to occur over a second set of time intervals subsequent to the first set of time intervals based at least in part on the plurality of energy functions and one or more machine-learned inference models; determining a loss associated with one or more comparisons of the one or more three-dimensional motion estimates of the one or more object instances relative to one or more ground-truth locations of the one or more object instances; and adjusting one or more parameters of the plurality of machine-learned feature extraction models based at least in part on the loss.

Furthermore, the one or more memory devices of the operations computing system 104 can store data including instructions used to implement one or more machine-learned models that have been configured and/or trained to generate an output based at least in part on an input provided to the one or more machine-learned models. For example, the one or more machine-learned models stored in the one or more memory devices of the operations computing system 104 can include one or more convolutional neural networks, one or more residual convolutional neural networks, one or more recurrent neural networks, and/or one or more recursive neural networks. Further, the one or more machine-learned models stored in the one or more memory devices of the operations computing system 104 can include one or more machine-learned feature extraction models, one or more machine-learned inference models, one or more machine-learned segmentation models, one or more machine-learned stereo matching models, and/or one or more machine-learned optical flow models, which are described herein including in the methods 300-1000 that are depicted in FIGS. 3-10.

Furthermore, the operations computing system 104 can be configured to monitor and communicate with the vehicle 108 and/or its users to coordinate a vehicle service provided by the vehicle 108. To do so, the operations computing system 104 can manage a database that includes data including state data associated with the state of one or more objects including one or more objects external to the vehicle 108. The state data can include a location of an object (e.g., a latitude and longitude of an object detected by the one or more sensors 114 of the vehicle 108), the state of a vehicle (e.g., the velocity, acceleration, and/or location of the vehicle 108), or the state of objects external to a vehicle (e.g., the physical dimensions, velocity, acceleration, heading, location, shape, and/or appearance of objects external to the vehicle).

The operations computing system 104 can communicate with the one or more remote computing devices 106 and/or the vehicle 108 via one or more communications networks including the communications network 102. The communications network 102 can send and/or receive signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 102 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 108.

Each of the one or more remote computing devices 106 can include one or more processors and one or more memory devices. The one or more memory devices can be used to store instructions that when executed by the one or more processors of the one or more remote computing devices 106 cause the one or more processors to perform operations and/or functions including operations and/or functions associated with the vehicle 108 including sending and/or receiving data or signals to and from the vehicle 108, monitoring the state of the vehicle 108, and/or controlling the vehicle 108. Furthermore, the one or more memory devices of the one or more remote computing devices 106 can be used to store data including the scene data, the training data, and/or the one or more machine-learned models that are stored in the operations computing system 104.

The one or more remote computing devices 106 can communicate (e.g., exchange data and/or signals) with one or more devices including the operations computing system 104 and the vehicle 108 via the communications network 102. For example, the one or more remote computing devices 106 can request the location of the vehicle 108 or the state of one or more objects detected by the one or more sensors 114 of the vehicle 108, via the communications network 102.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 108 including a location (e.g., a latitude and longitude), a velocity, an acceleration, a trajectory, and/or a path of the vehicle 108 based in part on signals or data exchanged with the vehicle 108. In some implementations, the operations computing system 104 can include the one or more remote computing devices 106.

The vehicle 108 can be a ground-based vehicle (e.g., an automobile, a motorcycle, a train, a tram, a tracked vehicle, a light electric vehicle, a moped, a scooter, and/or an electric bicycle), an aircraft (e.g., airplane or helicopter), a boat, a submersible vehicle (e.g., a submarine), an amphibious vehicle, a hovercraft, a robotic device (e.g. a bipedal, wheeled, or quadrupedal robotic device), and/or any other type of vehicle. The vehicle 108 can be an autonomous vehicle that can perform various actions including driving, navigating, and/or operating, with minimal and/or no interaction from a human driver. The vehicle 108 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 108 can provide driving and navigational operation with minimal and/or no interaction from a human driver present in the vehicle. A semi-autonomous operational mode can be one in which the vehicle 108 can operate with some interaction from a human driver present in the vehicle. Park and/or sleep modes can be used between operational modes while the vehicle 108 performs various actions including waiting to provide a subsequent vehicle service, and/or recharging between operational modes.

An indication, record, and/or other data indicative of the state of the vehicle 108, the state of one or more passengers of the vehicle 108, and/or the state of an environment external to the vehicle 108 including one or more objects (e.g., the physical dimensions, velocity, acceleration, heading, location, and/or appearance of the one or more objects) can be stored locally in one or more memory devices of the vehicle 108. Furthermore, the vehicle 108 can provide data indicative of the state of the one or more objects (e.g., physical dimensions, velocity, acceleration, heading, location, and/or appearance of the one or more objects) within a predefined distance of the vehicle 108 to the operations computing system 104, which can store an indication, record, and/or other data indicative of the state of the one or more objects within a predefined distance of the vehicle 108 in one or more memory devices associated with the operations computing system 104 (e.g., remote from the vehicle).

The vehicle 108 can include and/or be associated with the vehicle computing system 112. The vehicle computing system 112 can include one or more computing devices located onboard the vehicle 108. For example, the one or more computing devices of the vehicle computing system 112 can be located on and/or within the vehicle 108. The one or more computing devices of the vehicle computing system 112 can include various components for performing various operations and functions including any of the one or more operations and/or functions performed by the operations computing system 104 and/or the one or more remote computing devices 106. Further, the one or more computing devices of the vehicle computing system 112 can include one or more processors and one or more tangible non-transitory, computer readable media (e.g., memory devices). The one or more tangible non-transitory, computer readable media can store instructions that when executed by the one or more processors cause the vehicle 108 (e.g., its computing system, one or more processors, and other devices in the vehicle 108) to perform operations and/or functions, including accessing scene data; generating a plurality of extracted visual cues; encoding the plurality of visual cues using a plurality of energy functions; and determining one or more three-dimensional motion estimates of one or more object instances over a second set of time intervals subsequent to the first set of time intervals. Furthermore, the one or more memory devices of the vehicle computing system 112 can be used to store data including the scene data, the training data, and/or the one or more machine-learned models that are stored in the operations computing system 104.

Furthermore, the vehicle computing system 112 can perform one or more operations associated with the control, exchange of data, and/or operation of various devices and systems including robotic devices, augmented reality devices, and/or other computing devices.

As depicted in FIG. 1, the vehicle computing system 112 can include the one or more sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more sensors 114 can be configured to generate and/or store data including the sensor data 116 associated with one or more objects that are proximate to the vehicle 108 (e.g., within range or a field of view of one or more of the one or more sensors 114). The one or more sensors 114 can include one or more Light Detection and Ranging (LiDAR) systems, one or more Radio Detection and Ranging (RADAR) systems, one or more cameras (e.g., visible spectrum cameras and/or infrared cameras), one or more sonar systems, one or more motion sensors, and/or other types of image capture devices and/or sensors. The sensor data 116 can include image data, radar data, LiDAR data, sonar data, and/or other data acquired by the one or more sensors 114. The one or more objects can include, for example, pedestrians, vehicles, bicycles, buildings, roads, sidewalks, foliage, utility structures, bodies of water, and/or other objects. The one or more objects can be located on or around (e.g., in the area surrounding the vehicle 108) various parts of the vehicle 108 including a front side, rear side, left side, right side, top, or bottom of the vehicle 108. The sensor data 116 can be indicative of locations associated with the one or more objects within the surrounding environment of the vehicle 108 at one or more times. For example, sensor data 116 can be indicative of one or more LiDAR point clouds associated with the one or more objects within the surrounding environment. The one or more sensors 114 can provide the sensor data 116 to the autonomy computing system 120.

In addition to the sensor data 116, the autonomy computing system 120 can retrieve or otherwise obtain data including the map data 122. The map data 122 can provide detailed information about the surrounding environment of the vehicle 108. For example, the map data 122 can provide information regarding: the identity and/or location of different roadways, road segments, buildings, or other items or objects (e.g., lampposts, crosswalks and/or curbs); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 108. The positioning system 118 can be any device or circuitry for analyzing the position of the vehicle 108. For example, the positioning system 118 can determine a position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 108 can be used by various systems of the vehicle computing system 112 and/or provided to one or more remote computing devices (e.g., the operations computing system 104 and/or the remote computing device 106). For example, the map data 122 can provide the vehicle 108 relative positions of the surrounding environment of the vehicle 108. The vehicle 108 can identify its position within the surrounding environment (e.g., across six axes) based at least in part on the data described herein. For example, the vehicle 108 can process the sensor data 116 (e.g., LiDAR data, camera data) to match it to a map of the surrounding environment to get a determination of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 108 and determine a motion plan for controlling the motion of the vehicle 108 accordingly. For example, the autonomy computing system 120 can receive the sensor data 116 from the one or more sensors 114, attempt to determine the state of the surrounding environment by performing various processing techniques on the sensor data 116 (and/or other data), and generate an appropriate motion plan through the surrounding environment, including for example, a motion plan navigates the vehicle 108 around the current and/or predicted locations of one or more objects detected by the one or more sensors 114. The autonomy computing system 120 can control the one or more vehicle control systems 138 to operate the vehicle 108 according to the motion plan.

The autonomy computing system 120 can identify one or more objects that are proximate to the vehicle 108 based at least in part on the sensor data 116 and/or the map data 122. For example, the perception system 124 can obtain state data 130 descriptive of a current and/or past state of an object that is proximate to the vehicle 108. The state data 130 for each object can describe, for example, an estimate of the object's current and/or past: location and/or position; speed; velocity; acceleration; heading; orientation; size/footprint (e.g., as represented by a bounding shape); class (e.g., pedestrian class vs. vehicle class vs. bicycle class), and/or other state information. The perception system 124 can provide the state data 130 to the prediction system 126 (e.g., for predicting the movement of an object).

The prediction system 126 can generate prediction data 132 associated with each of the respective one or more objects proximate to the vehicle 108. The prediction data 132 can be indicative of one or more predicted future locations of each respective object. The prediction data 132 can be indicative of a predicted path (e.g., predicted trajectory) of at least one object within the surrounding environment of the vehicle 108. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

The motion planning system 128 can determine a motion plan and generate motion plan data 134 for the vehicle 108 based at least in part on the prediction data 132 (and/or other data). The motion plan data 134 can include vehicle actions with respect to the objects proximate to the vehicle 108 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 108 can perform a certain action (e.g., pass an object) without increasing the potential risk to the vehicle 108 and/or violating any traffic laws (e.g., speed limits, lane boundaries, signage). The motion plan data 134 can include a planned trajectory, velocity, acceleration, and/or other actions of the vehicle 108.

The motion planning system 128 can provide the motion plan data 134 with data indicative of the vehicle actions, a planned trajectory, and/or other operating parameters to the vehicle control systems 138 to implement the motion plan data 134 for the vehicle 108. For instance, the vehicle 108 can include a mobility controller configured to translate the motion plan data 134 into instructions. By way of example, the mobility controller can translate a determined motion plan data 134 into instructions for controlling the vehicle 108 including adjusting the steering of the vehicle 108 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections). In some implementations, the communications system 136 can allow communication among one or more of the system on-board the vehicle 108. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop and/or smartphone) can be viewable by a user of the vehicle 108 that is located in the front of the vehicle 108 (e.g., driver's seat, front passenger seat). Additionally, or alternatively, a display device can be viewable by a user of the vehicle 108 that is located in the rear of the vehicle 108 (e.g., a back passenger seat). For example, the autonomy computing system 120 can provide one or more outputs including a graphical display of the location of the vehicle 108 on a map of a geographical area within one kilometer of the vehicle 108 including the locations of objects around the vehicle 108. A passenger of the vehicle 108 can interact with the one or more human-machine interfaces 140 by touching a touchscreen display device associated with the one or more human-machine interfaces to indicate, for example, a stopping location for the vehicle 108.

In some embodiments, the vehicle computing system 112 can perform one or more operations including activating, based at least in part on one or more signals or data (e.g., the sensor data 116, the map data 122, the state data 130, the prediction data 132, and/or the motion plan data 134) one or more vehicle systems associated with operation of the vehicle 108. For example, the vehicle computing system 112 can send one or more control signals to activate one or more vehicle systems that can be used to control and/or direct the travel path of the vehicle 108 through an environment.

By way of further example, the vehicle computing system 112 can activate one or more vehicle systems including: the communications system 136 that can send and/or receive signals and/or data with other vehicle systems, other vehicles, or remote computing devices (e.g., remote server devices); one or more lighting systems (e.g., one or more headlights, hazard lights, and/or vehicle compartment lights); one or more vehicle safety systems (e.g., one or more seatbelt and/or airbag systems); one or more notification systems that can generate one or more notifications for passengers of the vehicle 108 (e.g., auditory and/or visual messages about the state or predicted state of objects external to the vehicle 108); braking systems; propulsion systems that can be used to change the acceleration and/or velocity of the vehicle which can include one or more vehicle motor or engine systems (e.g., an engine and/or motor used by the vehicle 108 for locomotion); and/or steering systems that can change the path, course, and/or direction of travel of the vehicle 108.

Figure 2:
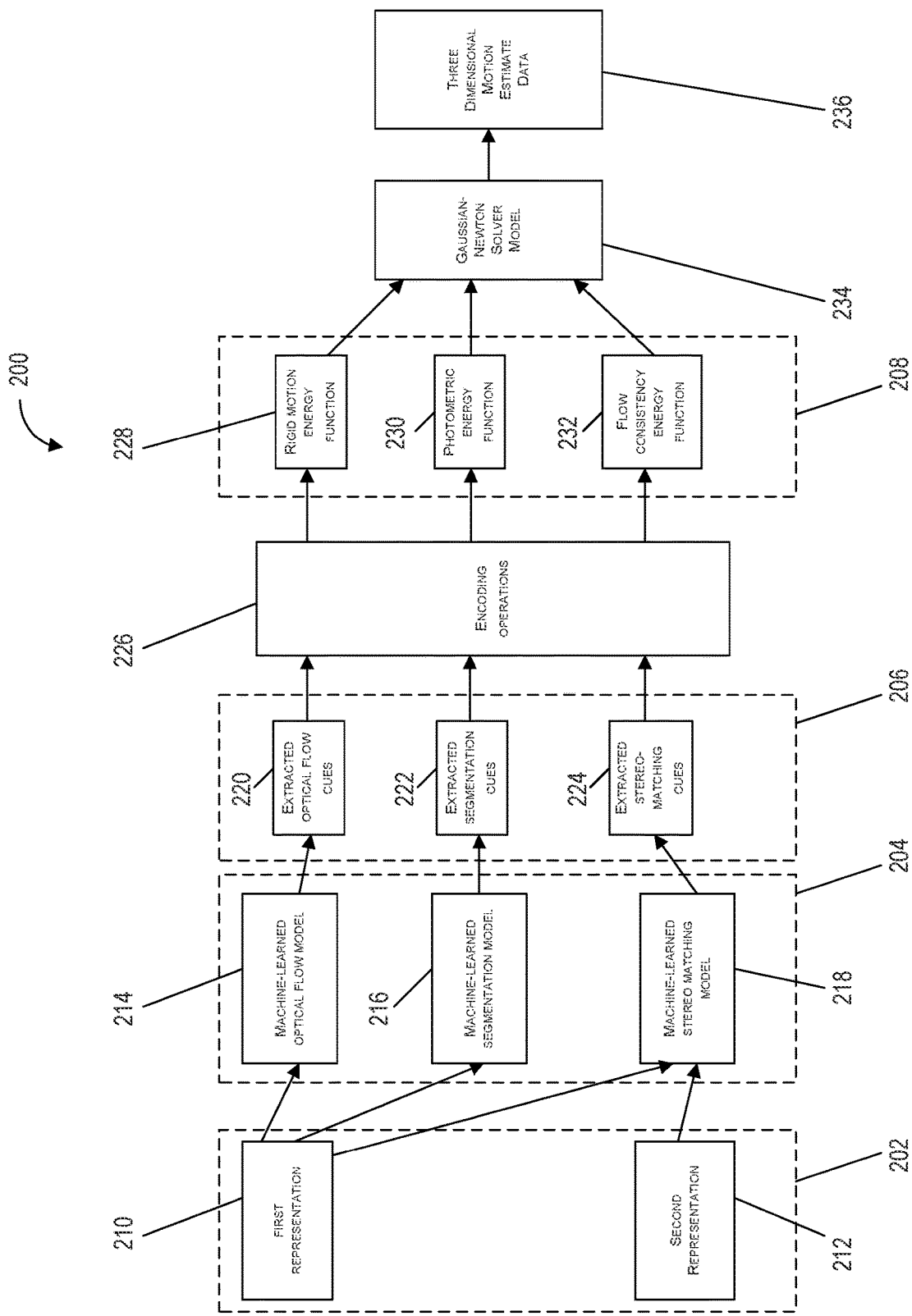
FIG. 2 depicts an example of a scene flow model according to example embodiments of the present disclosure.

FIG. 2 depicts an example of a scene flow model according to example embodiments of the present disclosure. One or more operations and/or functions in FIG. 2 can be implemented and/or performed by one or more devices (e.g., one or more computing devices) and/or systems including, for example, the operations computing system 104, the vehicle 108, or the vehicle computing system 112, which are depicted in FIG. 1. Further, the one or more devices and/or systems in FIG. 2 can include one or more features of one or more devices and/or systems including, for example, the operations computing system 104, the vehicle 108, or the vehicle computing system 112, which are depicted in FIG. 1.

As illustrated, FIG. 2 shows an example of a scene flow model 200 including a plurality of representations 202, a plurality of machine-learned feature extraction models 204, plurality of extracted visual cues 206, one or more machine-learned inference models 208, a first plurality of representations 210, a second plurality of representations 212, machine-learned optical flow model 214, machine-learned segmentation model 216, machine-learned stereo matching model 218, one or more extracted optical flow cues 220, one or more extracted segmentation cues 222, one or more extracted stereo-matching cues 224, machine-learned encoding operations 226, a rigid motion error energy model 228, a photometric error energy model 230, a flow consistency energy model 232, a Gaussian-Newton solver model 234, and three-dimensional motion estimate data 236.

The plurality of representations 202 includes a first plurality of representations 210 and a second plurality of representations 212. The first plurality of representations 210 can include a plurality of images of an environment from a first perspective over a first set of time intervals and the second plurality of representations 212 can include a plurality of images of the same environment from a second perspective over the same first set of time intervals. For example, the first representation 210 and the second representation 212 can be stereo images of the same environment at the same time interval from a left and right perspective respectively.

The plurality of machine-learned feature extraction models 204 can include the machine-learned optical flow model 214, the machine-learned segmentation model 216, and/or the machine-learned stereo matching model 218. The plurality of machine-learned feature extraction models 204 can be configured and/or trained to receive one or more inputs; perform one or more operations including determining one or more features and/or one or more visual cues of the one or more inputs; and generate an output including a plurality of extracted visual cues in which the one or more features and/or one or more visual cues are identified and/or determined. The machine-learned optical flow model 214 can be configured and/or trained to determine an optical flow and generate the one or more extracted optical flow cues 220 based at least in part on the first plurality of representations 210. The machine-learned segmentation model 216 can be configured and/or trained to determine one or more object instance segments and generate the one or more extracted segmentation cues 222 based at least in part on the first plurality of representations 210. The machine-learned stereo matching model 218 can be configured and/or trained to determine one or more depth estimates and generate the one or more extracted stereo-matching cues 224 based at least in part on the plurality of representations 202.

The first plurality of representations 210 can be used as an input to the machine-learned optical flow model 214, the machine-learned segmentation model 216, and the machine-learned stereo matching model 218. The second plurality of representations 212 can be used as an input to the machine-learned stereo matching model 218. As such the machine-learned optical flow model 214 and the machine-learned segmentation model 216 can receive a monocular input from the first plurality of representations 210 and the machine-learned stereo matching model 218 can receive a binocular input including the first plurality of representations 210 and the second plurality of representations 212. The output of the machine-learned optical flow model 214, the machine-learned segmentation model 216, and/or the machine-learned stereo matching model 218 can include the plurality of extracted visual cues which can be used to perform the machine-learned encoding operations 226.

The machine-learned encoding operations 226 can include one or more operations that encode visual cues using a plurality of energy functions. Furthermore, the machine-learned encoding operations 226 can be performed by any combination of the plurality of machine-learned feature extraction models 204. The machine-learned encoding operations 226 can include encoding some combination of the plurality of extracted visual cues and the plurality of representations 202 using a plurality of energy functions. For example, the one or more extracted segmentation cues 222 generated by the machine-learned segmentation model 216 can determine the outline of object instances depicted in an image of an environment including vehicles and pedestrians. In some embodiments, the use of the plurality of extracted visual cues 206 on the first plurality of representations 210 can result in a plurality of extracted visual cues that includes representations of each individual vehicle and pedestrian depicted in the image. The plurality of extracted visual cues encoded by the machine-learned encoding operations 226 can be used as an input to the one or more inference models 208.

The one or more machine-learned inference models 208 can include the rigid motion error energy model 228, the photometric error energy model 230, and/or the flow consistency energy model 232. The one or more machine-learned inference models 208 can be configured and/or trained to receive one or more inputs including the plurality of extracted visual cues; perform one or more operations on the plurality of extracted visual cues including minimizing energy associated with the plurality of extracted visual cues; and generate an output including encodings of the energy associated with each of the one or more machine-learned inference models 208 that can then be used as an input to the Gaussian-Newton solver model 234. The rigid motion error energy model 228 can be configured and/or trained to determine similarity of one or more optical flow motion estimates of the one or more object instances to one or more stereo motion estimates of the one or more object instances.

The photometric error energy model 230 can be configured and/or trained to perform one or more comparisons of one or more portions of each of the plurality of representations at an initial time interval to one or more portions of each of the plurality of representations at a time interval subsequent to the initial time interval. The flow consistency energy model 232 can be configured and/or trained to determine a difference between a two-dimensional rigid flow and an optical flow of one or more portions of the plurality of extracted visual cues.

The Gaussian-Newton solver model 234 can receive as input, the encodings of the energy associated with each of the one or more machine-learned inference models 208. The Gaussian-Newton solver model 234 can be configured and/or trained to minimize the energy associated with the input by performing one or more operations to iteratively minimize a least-squared function associated with rigid motion of the one or more object instances over the first set of time intervals. Furthermore, based on the input, the Gaussian-Newton solver model 234 can be configured and/or trained to identify one or more three-dimensional motion estimates of the one or more object instances determined and/or identified in the plurality of representations 202. The Gaussian-Newton solver model 234 can then generate output including the three-dimensional motion estimate data 236 which can include the one or more three-dimensional motion estimates.

Figure 3:
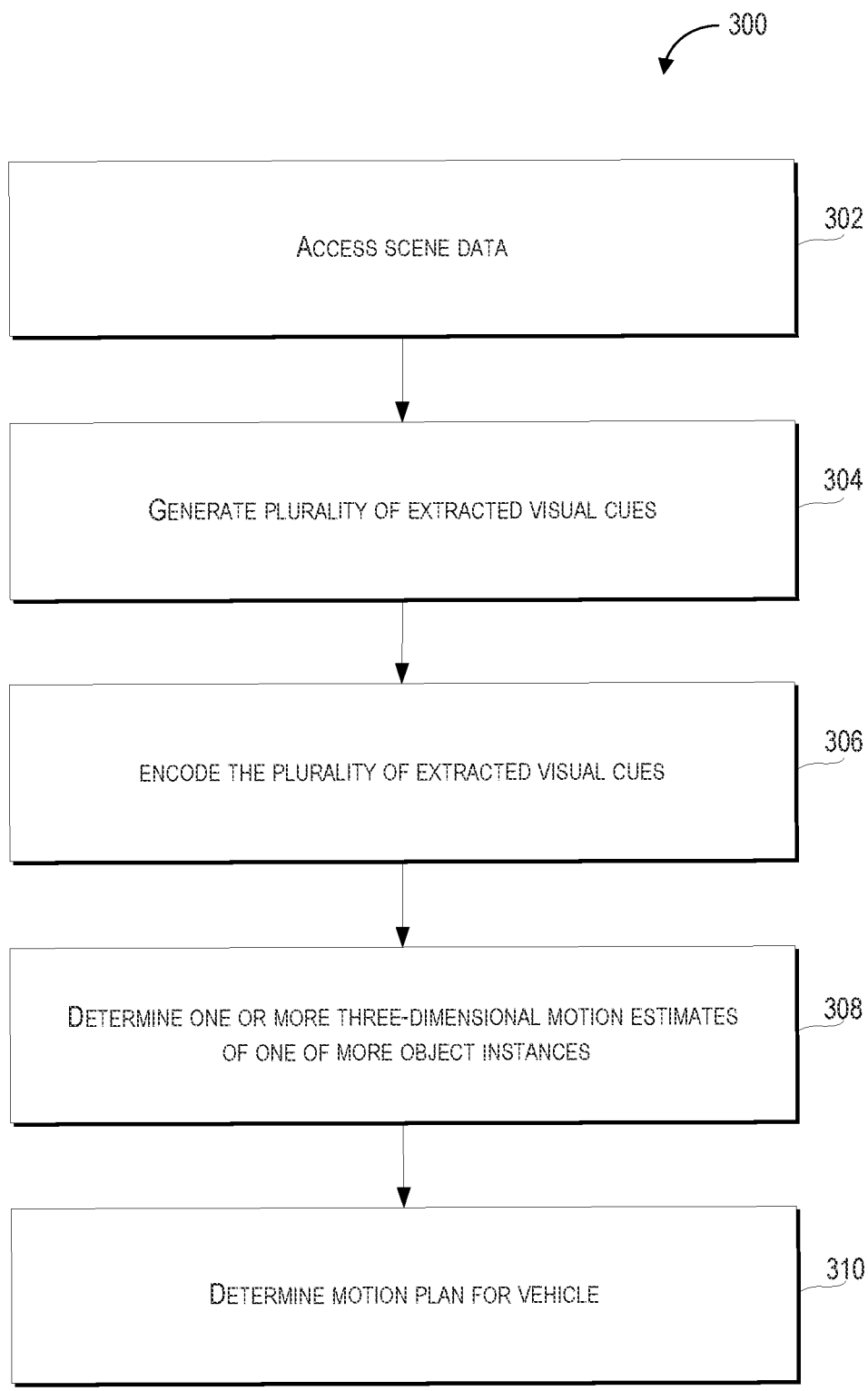
FIG. 3 depicts a flow diagram of an example method of scene flow estimation according to example embodiments of the present disclosure.

FIG. 3 depicts a flow diagram of an example method of scene flow estimation according to example embodiments of the present disclosure. One or more portions of a method 300 can be implemented by one or more devices (e.g., one or more computing devices) or systems including, for example, the operations computing system 104, the vehicle 108, or the vehicle computing system 112, shown in FIG. 1. Moreover, one or more portions of the method 300 can be implemented as an algorithm on the hardware components of the devices described herein (e.g., as in FIG. 1) to, for example, generate outputs including estimated motion flow of objects in an environment based on representations of the environment from different perspectives. FIG. 3 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 302, the method 300 can include accessing scene data that can include a plurality of representations of an environment over a first set of time intervals. In some embodiments, the plurality of representations can include a first plurality of representations of the environment from a first perspective and a second plurality of representations of the environment from a second perspective. For example, the operations computing system 104 can access scene data including a first plurality of representations and the second plurality of representations respectively that can correspond to a first plurality of stereo images from a first perspective and a second plurality of stereo images from a second perspective that is different from the first perspective.

In some embodiments, the plurality of representations in the scene data can include one or more images that can be encoded in one or more raster (e.g., bitmap), vector, and/or voxel image formats. Further, the one or more images can include one or more two-dimensional representations of an environment including two-dimensional images captured over a first set of time intervals. For example, the plurality of representations can include images of an environment captured by a plurality of cameras at sixtieth of a second time intervals.

In some embodiments, the scene data can be stored in a storage device or storage system (e.g., a vehicle and/or a robotic system) associated with the operating computing system 104 and/or the vehicle computing system 112. For example, the vehicle 108 associated with the vehicle computing system 112 can store the scene data on one or more memory devices of the vehicle computing system 112.

At 304, the method 300 can include generating a plurality of extracted visual cues based at least in part on the plurality of representations and plurality of machine-learned feature extraction models. In some embodiments, the plurality of machine-learned feature extraction models can be configured and/or trained to receive the plurality of representations as input; determine and/or identify one or more features and/or one or more visual cues of the plurality of representations; and generate an output including the plurality of extracted visual cues. Further, the one or more visual cues can include one or more instance segmentation cues, one or more optical flow cues, and/or one or more stereo cues.

For example, the operations computing system 104 can use the plurality of machine-learned feature extraction models to generate a plurality of extracted visual cues including an optical flow representation of the plurality of representations, a segmented representation of the plurality of representations, and/or a stereo representation of the plurality of representations.

In some embodiments, at least one of the plurality of machine-learned feature extraction models can be configured to generate a portion of the plurality of extracted visual cues based at least in part on the first set of the plurality of representations of the environment from the first perspective and the second set of the plurality of representations of the environment from the second perspective. For example, the plurality of feature extraction models can include a machine-learned stereo matching model that can generate a portion of the plurality of extracted visual cues that includes stereo representations based at least in part on the first set of the plurality of representations and the second set of the plurality of representations.

In some embodiments, the plurality of machine-learned feature extraction models can include a machine-learned segmentation model configured and/or trained to generate and/or determine the portion of the plurality of extracted visual cues including one or more object instance segments associated with the plurality of representations. For example, the machine-learned segmentation model can determine segments of the plurality of representations based at least in part on the detection of boundaries, lines, and visual features in the plurality of representations.

In some embodiments, the plurality of machine-learned feature extraction models can include a machine-learned stereo matching model configured and/or trained to generate and/or determine the portion of the plurality of extracted visual cues including one or more depth estimates associated with the plurality of representations. For example, the computing system can use the machine-learned stereo matching model to estimate one or more distances between the one or more object instances in the plurality of representations based at least in part on one or more comparisons of the first plurality of representations to the second plurality of representations.

In some embodiments, the machine-learned stereo matching model is trained to determine the one or more depth estimates associated with the plurality of representations based at least in part on the first set of the plurality of representations and the second set of the plurality of representations.

In some embodiments, the plurality of machine-learned feature extraction models can include a machine-learned optical flow model that is trained to generate and/or determine an optical flow associated with the plurality of representations. For example, the machine-learned optical flow models can determine the direction in which one or more object instances in the plurality of representations are moving over the first set of time intervals.

At 306, the method 300 can include encoding the plurality of extracted visual cues using a plurality of energy functions. For example, the operations computing system 104 can encode the plurality of extracted visual cues as a photometric error energy, a rigid motion energy, and/or a flow consistency energy. As such, the plurality of extracted visual cues includes some of the one or more features and/or one or more visual cues that are determined to be significant and masks the one or more features and/or one or more visual cues that are not considered to be significant based at least in part on the configuration and/or training of the one or more machine-learned feature extraction models.

For example, the operations computing system 104 can perform one or more operations to use the plurality of extracted visual cues to mask one or more features and/or one or more visual cues of the plurality of representations. By way of further example, the operations computing system 104 can use the plurality of extracted visual cues to mask one or more features of the plurality of representations and thereby encode the plurality of visual cues using a plurality of energy functions.

In some embodiments, encoding the plurality of extracted visual cues using a plurality of energy functions can include encoding each instance of the plurality of visual cues as a plurality of energy functions.

In some embodiments, encoding the plurality of extracted visual cues using a plurality of energy functions can include using and/or employing a plurality of geometry based energy functions to encode the structural geometric relationship between each of the plurality of extracted visual cues (e.g., each instance of the plurality of extracted visual cues).

At 308, the method 300 can include determining one or more three-dimensional motion estimates of the one or more object instances over a second set of time intervals based at least in part on the plurality of energy functions and/or one or more machine-learned inference models. The second set of time intervals can be subsequent to (e.g., occur after) the first set of time intervals.

The one or more object instances can, for example, be based at least in part on one or more segments of the plurality of representations. Further, the one or more machine-learned inference models can be configured and/or trained to determine the one or more three-dimensional motion estimates of the one or more object instances based at least in part on stereo and flow estimates derived from changes in the locations of the one or more object instances over the first set of time intervals.

For example, the operations computing system 104 can determine one or more three-dimensional motion estimates of the one or more object instances including the location of each of the one or more object instances at each of the first set of time intervals.

At 310, the method 300 can include determining a motion plan for a vehicle based at least in part on the one or more three-dimensional motion estimates of the one or more objects. The motion plan can include one or more locations for the vehicle that do not traverse the one or more three-dimensional motion estimates of the one or more objects. For example, the vehicle computing system 112 can determine the one or more three-dimensional motion estimates of the one or more object instances based at least in part on the plurality of representations including one or more images captured from a pair of cameras on the vehicle 108. The one or more three-dimensional motion estimates can then be used as an input for a vehicle motion planning system that can navigate the vehicle 108 around through the three-dimensional environment determined based at least in part on the one or more three-dimensional motion estimates.

Figure 4:
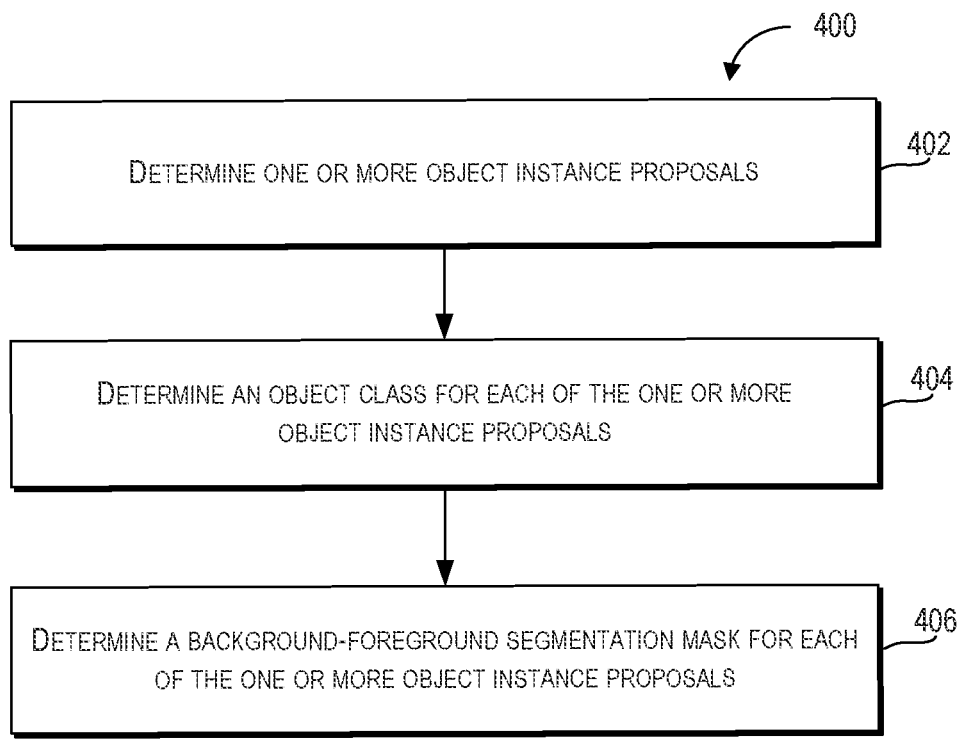
FIG. 4 depicts a flow diagram of an example method of generating extracted visual cues as part of scene flow estimation according to example embodiments of the present disclosure.

FIG. 4 depicts a flow diagram of an example method of generating extracted visual cues as part of scene flow estimation according to example embodiments of the present disclosure. One or more portions of a method 400 can be implemented by one or more devices (e.g., one or more computing devices) or systems including, for example, the operations computing system 104, the vehicle 108, or the vehicle computing system 112, shown in FIG. 1. Moreover, one or more portions of the method 400 can be implemented as an algorithm on the hardware components of the devices described herein (e.g., as in FIG. 1) to, for example, generate outputs including estimated motion flow of objects in an environment based on representations of the environment from different perspectives. In some embodiments, one or more portions of the method 400 can be performed as part of the method 300 that is depicted in FIG. 3. Further, one or more portions of the method 400 can be performed as part of generating a plurality of extracted visual cues based at least in part on the plurality of representations and plurality of machine-learned feature extraction models as described in 304 of the method 300. FIG. 4 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 402, the method 400 can include determining one or more object instance proposals associated with the plurality of representations. For example, the operations computing system 104 can use the plurality of machine-learned feature extraction models to propose one or more portions of the plurality of representations that are associated with one or more object instances based at least in part on detection of object instance boundaries that distinguish an object instance from other portions of the environment depicted in the plurality of representations. In some embodiments, determining the one or more object instance proposals associated with the plurality of representations can be based at least in part on use of a machine-learned segmentation model.

In some embodiments, a portion of the plurality of extracted visual cues (e.g., the plurality of extracted visual cues of the method 300) can be based at least in part on the one or more object instance proposals.

At 404, the method 400 can include determining an object class for each of the one or more object instance proposals respectively. For example, the operations computing system 104 can determine a class for an object instance proposal based at least in part on the one or more features and/or one or more visual cues of the object instance proposal. By way of further example, the operations computing system 104 can determine that an object instance proposal is a motor vehicle based at least in part on the determined size, geometry, and/or coloring of the object instance proposal.

At 406, the method 400 can include determining a background-foreground segmentation mask for each of the one or more object instance proposals. For example, the operations computing system 104 can determine an object instance proposal based on the one or more features and/or one or more visual cues of the object instance, determine that the object class associated with the object instance is the cyclist class, and determine that the cyclist is a moving object and therefore is part of the foreground. By way of further example, the computing system can determine an object instance proposal based on detected edges of the object instance, determine that the object instance is a building surface, and determine that the building surface is a static object and therefore part of the background.

Figure 5:
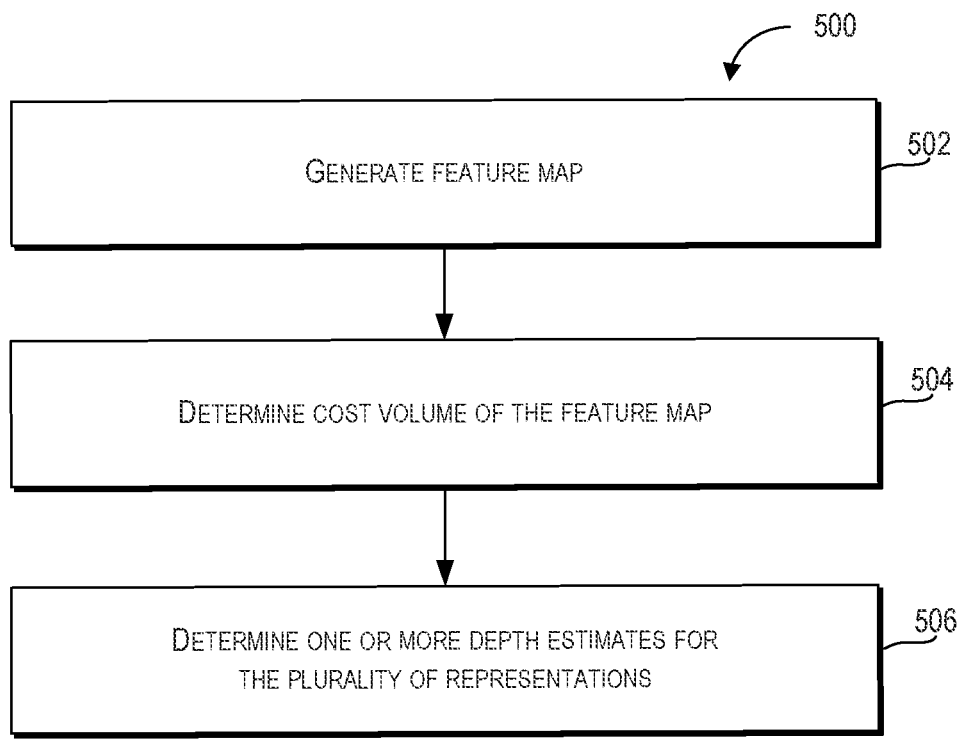
FIG. 5 depicts a flow diagram of an example method of determining depth estimates as part of scene flow estimation according to example embodiments of the present disclosure.

FIG. 5 depicts a flow diagram of an example method of determining depth estimates as part of scene flow estimation according to example embodiments of the present disclosure. One or more portions of a method 500 can be implemented by one or more devices (e.g., one or more computing devices) or systems including, for example, the operations computing system 104, the vehicle 108, or the vehicle computing system 112, shown in FIG. 1. Moreover, one or more portions of the method 500 can be implemented as an algorithm on the hardware components of the devices described herein (e.g., as in FIG. 1) to, for example, generate outputs including estimated motion flow of objects in an environment based on representations of the environment from different perspectives. In some embodiments, one or more portions of the method 500 can be performed as part of the method 300 that is depicted in FIG. 3. Further, one or more portions of the method 500 can be performed as part of generating a plurality of extracted visual cues based at least in part on the plurality of representations and plurality of machine-learned feature extraction models as described in 304 of the method 300. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 502, the method 500 can include generating a feature map based at least in part on the plurality of representations. For example, the operations computing system 104 can generate a feature map based at least in part on mapping one or more features and/or visual cues of the plurality of representations to a feature vector.

At 504, the method 500 can include determining a cost volume of the feature map based at least in part on an aggregation of context in different scales and different locations of the feature map. For example, the operations computing system 104 can determine the cost volume of the feature map can be based at least in part on one or more differences between a first feature that is associated with a first geometric feature and second feature associated with a second geometric feature that the first feature is a subset of. In some embodiments, determining the cost volume of the feature map can be based at least in part on use of a machine-learned stereo matching model to determine differences between features of representations of the same environment from different perspectives.

At 506, the method 500 can include determining one or more depth estimates for the plurality of representations based at least in part on aggregation of the cost volume.

Aggregation of the cost volume can include summing and/or averaging cost volume associated with one or more features of the feature map. In some embodiments, determining the one or more depth estimates for the plurality of representations can be based at least in part on the sum of differences between various features represented by the feature map. For example, the operations computing system 104 can determine a depth estimate for a smaller portion of a representation based at least in part on context associated with the entire representation that the smaller portion is a part of.

Figure 6:
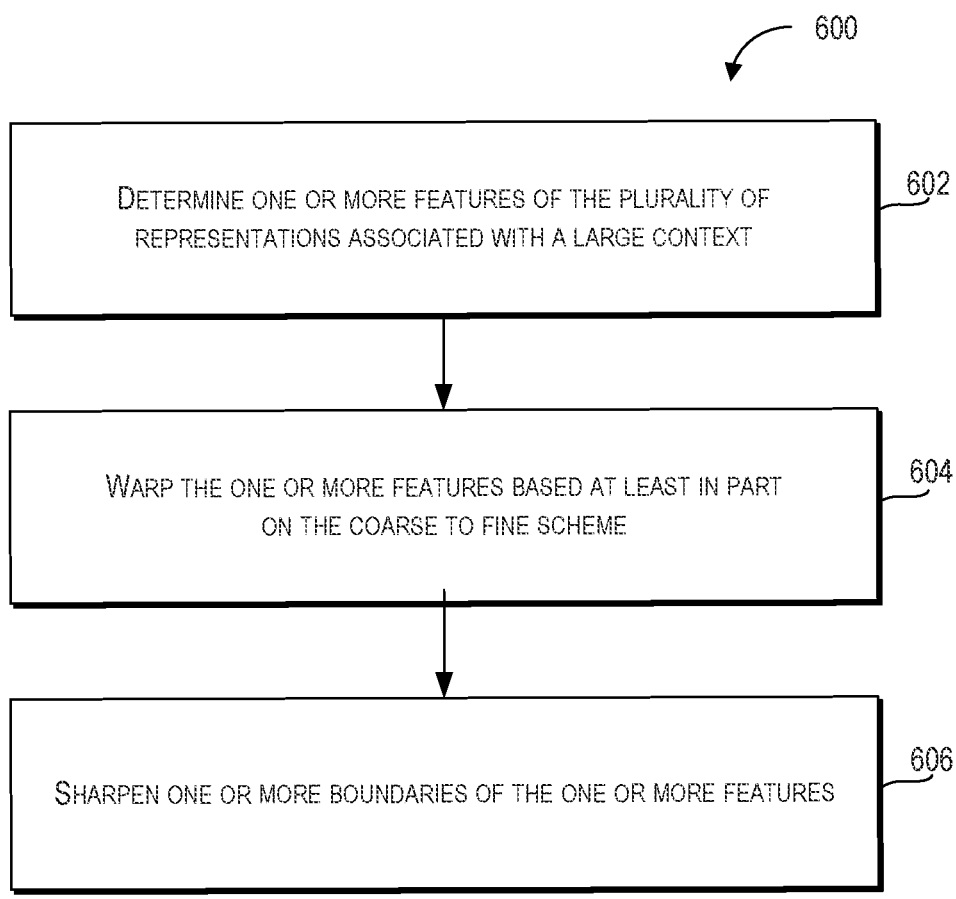
FIG. 6 depicts a flow diagram of an example method of determining optical flow as part of scene flow estimation according to example embodiments of the present disclosure.

FIG. 6 depicts a flow diagram of an example method of determining optical flow as part of scene flow estimation according to example embodiments of the present disclosure. One or more portions of a method 600 can be implemented by one or more devices (e.g., one or more computing devices) or systems including, for example, the operations computing system 104, the vehicle 108, or the vehicle computing system 112, shown in FIG. 1. Moreover, one or more portions of the method 600 can be implemented as an algorithm on the hardware components of the devices described herein (e.g., as in FIG. 1) to, for example, generate outputs including estimated motion flow of objects in an environment based on representations of the environment from different perspectives. In some embodiments, one or more portions of the method 600 can be performed as part of the method 300 that is depicted in FIG. 3. Further, one or more portions of the method 600 can be performed as part of generating a plurality of extracted visual cues based at least in part on the plurality of representations and plurality of machine-learned feature extraction models as described in 304 of the method 300. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 602, the method 600 can include determining one or more features of the plurality of representations that are associated with a large context. For example, the operations computing system 104 can determine one or more features of the plurality of representations that include object instances that exceed some size threshold with respect to the environment surrounding the object instance.

At 604, the method 600 can include warping the one or more features of the plurality of representations associated with a large context. Warping the one or more features of the plurality of representations associated with a large context can be based at least in part on a coarse to fine scheme. Warping the one or more features of the plurality of representations can include changing one or more geometric proportions of a first set of the plurality of representations of an environment from a first perspective to match a second set of the plurality of representations of the environment from a second perspective. For example, the one or more features of the plurality of representations can be stretched, skewed, increased in size, or decreased in size In some embodiments, the coarse to fine scheme can include estimating optical flow for a set of representations at an initial resolution based at least in part on warping a first representation of the set of representations to match a second representation of the set of representations; upsampling the set of representations to a higher resolution; propagating the results of the first warping operations to the upsampled set of representations; and iteratively repeating the warping, propagation of results, and upsampling over some predetermined number of times. Further, the use of the coarse to fine scheme can mitigate the effects of temporal anti-aliasing by warping the one or more features associated with low spatial frequencies (e.g., the shape of a bus) before warping the one or more features associated with high spatial frequencies (e.g., the fine details of edges on the doors of the bus).

At 606, the method 600 can include sharpening one or more boundaries associated with the one or more features. In some embodiments, the one or more boundaries can be boundaries associated with the one or more object instances. For example, the operations computing system 104 can sharpen the one or more boundaries associated with the one or more features by applying a bilateral or median filter to the one or more boundaries associated with the one or more features.

Figure 7:
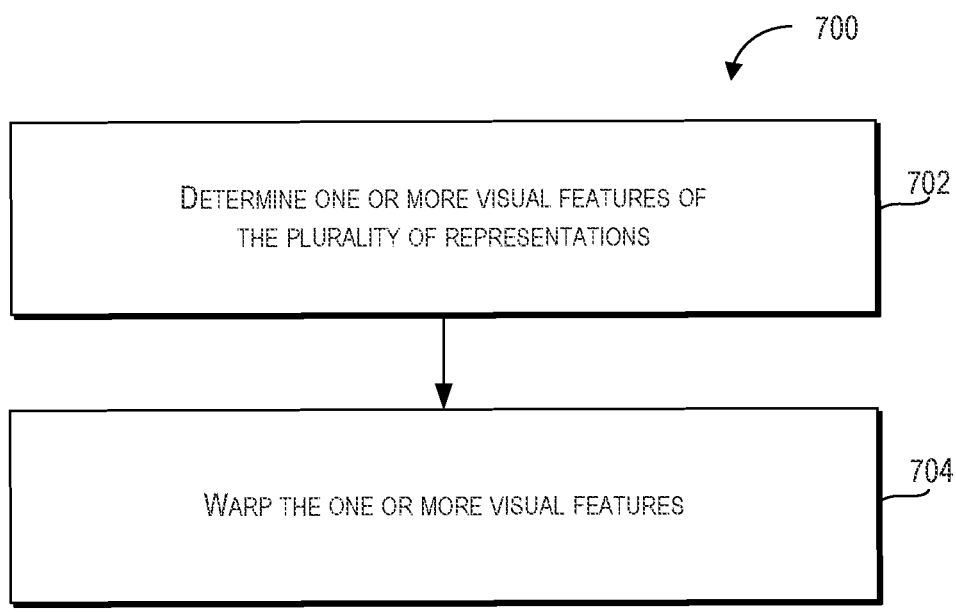
FIG. 7 depicts a flow diagram of an example method of determining optical flow as part of scene flow estimation according to example embodiments of the present disclosure.

FIG. 7 depicts a flow diagram of an example method of determining optical flow as part of scene flow estimation according to example embodiments of the present disclosure. One or more portions of a method 700 can be implemented by one or more devices (e.g., one or more computing devices) or systems including, for example, the operations computing system 104, the vehicle 108, or the vehicle computing system 112, shown in FIG. 1. Moreover, one or more portions of the method 700 can be implemented as an algorithm on the hardware components of the devices described herein (e.g., as in FIG. 1) to, for example, generate outputs including estimated motion flow of objects in an environment based on representations of the environment from different perspectives. In some embodiments, one or more portions of the method 700 can be performed as part of the method 300 that is depicted in FIG. 3 and/or the method 600 that is depicted in FIG. 6. Further, 702 of the method 700 can be performed as part of determining one or more features of the plurality of representations that are associated with a large context as described in 602 of the method 600; and 704 of the method 700 can be performed as part of warping the one or more features of the plurality of representations associated with a large context based at least in part on a coarse to fine scheme as described in 604 of the method 600. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 702, the method 700 can include determining one or more features which can include the one or more visual features of the plurality of representations associated with a large context based at least in part on a size of each visual feature of the one or more visual features. In some embodiments, the one or more visual features that have large context can include the one or more features with a spatially large context. For example, the operations computing system 104 can determine one or more features of the plurality of representations that include larger object instances including vehicles. In some embodiments, determining the one or more visual features of the one or more features of the plurality of representations associated with a large context can be based at least in part on use of a machine-learned optical flow model.

At 704, the method 700 can include warping the one or more visual features based at least in part on the size of each visual feature of the one or more visual features. In some embodiments, the one or more visual features that are relatively larger can be progressively warped before the one or more visual features that are relatively smaller. For example, the operations computing system 104 can warp visual features associated with the frame of a bicycle ridden by a cyclist before warping visual features associated with the pedals of the bicycle which are smaller than the frame of the bicycle.

Figure 8:
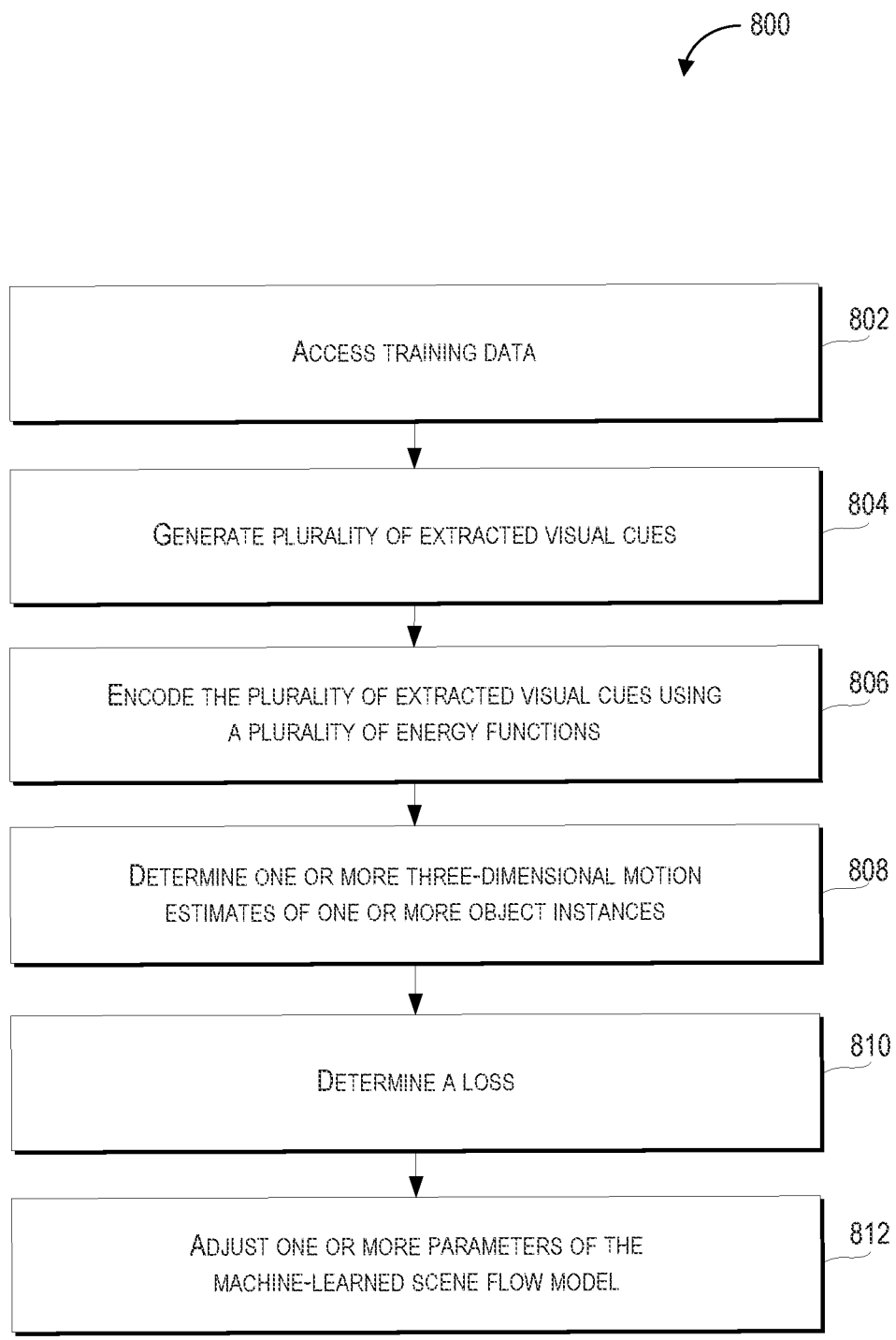
FIG. 8 depicts a flow diagram of an example method of training a machine-learned feature extraction model associated with scene flow estimation according to example embodiments of the present disclosure.

FIG. 8 depicts a flow diagram of an example method of training a machine-learned feature extraction model associated with scene flow estimation according to example embodiments of the present disclosure. One or more portions of a method 800 can be implemented by one or more devices (e.g., one or more computing devices) or systems including, for example, the operations computing system 104, the vehicle 108, or the vehicle computing system 112, shown in FIG. 1. Moreover, one or more portions of the method 800 can be implemented as an algorithm on the hardware components of the devices described herein (e.g., as in FIG. 1) to, for example, generate outputs including estimated motion flow of objects in an environment based on representations of the environment from different perspectives. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 802, the method 800 can include accessing training data that includes a plurality of representations of an environment over a first set of time intervals. In some embodiments, the plurality of representations can include a first plurality of representations of the environment from a first perspective and a second plurality of representations from a second perspective. For example, the operations computing system 104 can access training data including a first plurality of representations and the second plurality of representations respectively that can correspond to a first plurality of stereo images from a first perspective and a second plurality of stereo images from a second perspective that is different from the first perspective.

In some embodiments, the plurality of representations in the training data can include one or more images that can be encoded in one or more raster (e.g., bitmap), vector, and/or voxel image formats. Further, the one or more images can include one or more two-dimensional representations of an environment including two-dimensional images captured over a first set of time intervals. For example, the plurality of representations can include images of an environment captured by a plurality of cameras at tenth of a second time intervals.

In some embodiments, the training data can be stored in a storage device or storage system (e.g., a vehicle and/or a robotic system) associated with the operating computing system 104 and/or the vehicle computing system 112. For example, the vehicle 108 associated with the vehicle computing system 112 can store the training data on one or more memory devices of the vehicle computing system 112.

At 804, the method 800 can include generating a plurality of extracted visual cues based at least in part on the plurality of representations in the training data and plurality of machine-learned feature extraction models. In some embodiments, the plurality of machine-learned feature extraction models can be configured and/or trained to receive the plurality of representations in the training data as input; determine and/or identify one or more features and/or one or more visual cues of the plurality of representations; and generate an output including the plurality of extracted visual cues. For example, the operations computing system 104 can use the plurality of machine-learned feature extraction models to generate a plurality of extracted visual cues including an optical flow representation of the plurality of representations, a segmented representation of the plurality of representations, and/or a stereo representation of the plurality of representations.

At 806, the method 800 can include encoding the plurality of extracted visual cues using a plurality of energy functions. For example, the operations computing system 104 can encode the plurality of visual cues using a plurality of energy functions including an energy function associated with the rigid motion energy of some portion of the plurality of extracted visual cues. As such, the plurality of extracted visual cues includes some of the one or more features and/or one or more visual cues that are determined to be significant and masks the one or more features and/or one or more visual cues that are not considered to be significant based at least in part on the configuration and/or training of the one or more machine-learned feature extraction models.

For example, the operations computing system 104 can perform one or more operations to use the plurality of extracted visual cues to mask one or more features and/or one or more visual cues of the plurality of representations.

At 808, the method 800 can include determining one or more three-dimensional motion estimates of one or more object instances that are predicted to occur over a second set of time intervals based at least in part on the plurality of energy functions and one or more machine-learned inference models. The second set of time intervals can be subsequent to the first set of time intervals (e.g., occur in the next set of time intervals that immediately follow the first set of time intervals).

The one or more object instances can, for example, be based at least in part on one or more segments of the plurality of representations. Further, the one or more machine-learned inference models can be configured and/or trained to determine the one or more three-dimensional motion estimates of the one or more object instances based at least in part on stereo and optical flow estimates derived from changes in the locations of the one or more object instances over the first set of time intervals.

For example, the operations computing system 104 can determine one or more three-dimensional motion estimates of the one or more object instances including the location of each of the one or more object instances at each of the first set of time intervals.

At 810, the method 800 can include determining a loss associated with one or more comparisons of the one or more three-dimensional motion estimates of the one or more object instances relative to one or more ground-truth locations of the one or more object instances. The loss can be determined based at least in part on the evaluation of one or more loss functions that can be different, and which in some embodiments can have different weighting contributions to the loss. For example, the operations computing system 104 can determine the loss based at least in part on comparing the location of each of the one or more object instances in the one or more three-dimensional motion estimates to the one or more ground-truth locations of the one or more object instances; and associating reduction of the loss with reduction in the distance between the location of each of the one or more object instances in the one or more three-dimensional motion estimates to the one or more ground-truth locations of the one or more object instances.

Furthermore, the loss function can include various loss constituent functions that are used to improve the accuracy of the three-dimensional motion estimates of the object instances with respect to the ground-truth locations of the object instances. Accordingly, the accuracy of the three-dimensional motion estimates of the object instances can be positively correlated with their similarity to the ground-truth position. In some embodiments, the plurality of machine-learned models can be trained end-to-end. For example, various combinations of the plurality of machine-learned models including the machine-learned segmentation model, the machine-learned stereo matching model, and/or the machine-learned optical flow model can be trained end-to-end.

Furthermore, in some embodiments, the plurality of machine-learned feature extraction models can be trained based at least in part on minimization of a region of interest classification loss, a box regression loss, and/or a mask segmentation loss.

At 812, the method 800 can include adjusting one or more parameters of the plurality of machine-learned feature extraction models based at least in part on the loss. The one or more parameters of the plurality of machine-learned feature extraction models can be adjusted (e.g., weighted differently) based at least in part on the contributions that each of the one or more parameters make in terms of minimizing the loss. For example, the one or more parameters of the plurality of machine-learned feature extraction models that do not change the loss (e.g., e.g., cause the loss to increase or decrease) may be kept the same (e.g., not adjusted), the one or more parameters that decrease the loss can be weighted more heavily (e.g., adjusted to increase their contribution to the loss), and the one or more parameters that increase the loss can have their weighting reduced (e.g., adjusted to reduce their contribution to the loss). Accordingly, adjustment of the one or more parameters of the plurality of machine-learned feature extraction models over a plurality of iterations can result in a lower loss that can correspond to more accurate three-dimensional motion estimates of the one or more object instances relative to the ground-truth locations of the one or more object instances.

Figure 9:
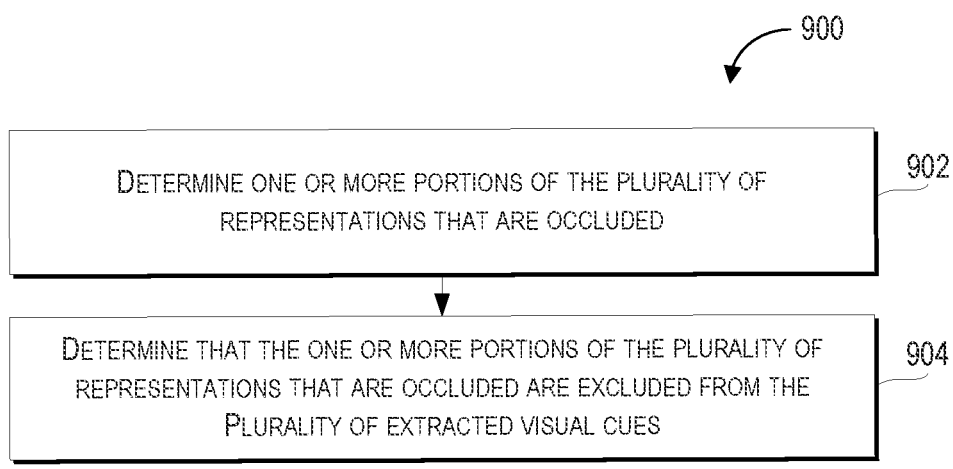
FIG. 9 depicts a flow diagram of an example method of determining occluded portions of representations as part of training a machine-learned feature extraction model according to example embodiments of the present disclosure.

FIG. 9 depicts a flow diagram of an example method of determining occluded portions of representations as part of training a machine-learned feature extraction model according to example embodiments of the present disclosure. One or more portions of a method 900 can be implemented by one or more devices (e.g., one or more computing devices) or systems including, for example, the operations computing system 104, the vehicle 108, or the vehicle computing system 112, shown in FIG. 1. Moreover, one or more portions of the method 900 can be implemented as an algorithm on the hardware components of the devices described herein (e.g., as in FIG. 1) to, for example, generate outputs including estimated motion flow of objects in an environment based on representations of the environment from different perspectives. In some embodiments, one or more portions of the method 900 can be performed as part of the method 800 that is depicted in FIG. 8. Further, one or more portions of the method 900 can be performed as part of generating a plurality of extracted visual cues based at least in part on the plurality of representations in the training data and plurality of machine-learned feature extraction models as described in 804 of the method 800. FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 902, the method 900 can include determining one or more portions of the plurality of representations that are occluded based at least in part on a disparity between a representation of the plurality of representations at an initial time interval and the representation at a time interval subsequent to the initial time interval. For example, object instances in an environment can become occluded when the movement of the moving object instance occludes another object instance. By way of further example, the operations computing system 104 can determine one or more portions of a representation at an initial time interval that are occluded due to a change in the viewpoint that obfuscates one or more portions of the representation in a subsequent time interval.

At 904, the method 900 can include determining that the one or more portions of the plurality of representations that are occluded are excluded from the plurality of extracted visual cues. The one or more portions of the plurality of representations that are occluded can be marked or labeled as occluded, which can result in those portions being excluded from inclusion in the plurality of extracted visual cues. For example, the operations computing system 104 can perform one or more operations to indicate one or more portions of the plurality of representations to exclude from the plurality of extracted visual cues.

Figure 10:
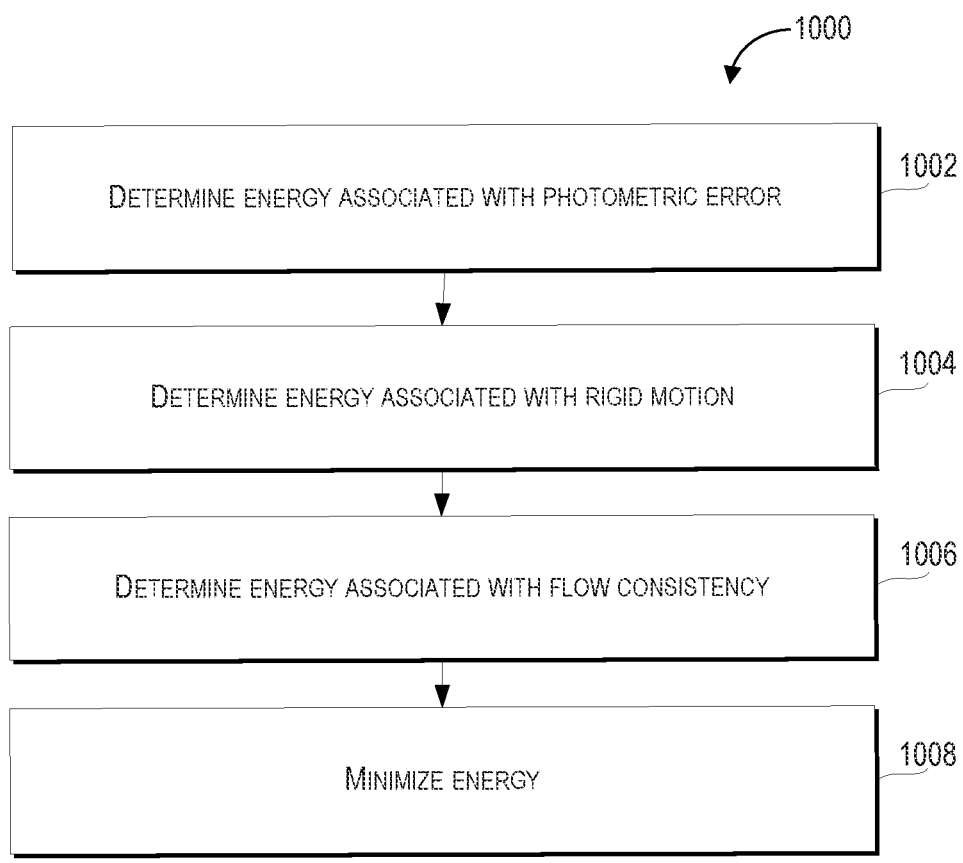
FIG. 10 depicts a flow diagram of an example method of determining energy associated with three-dimensional motion estimates as part of training a machine-learned feature extraction model according to example embodiments of the present disclosure.

FIG. 10 depicts a flow diagram of an example method of determining energy associated with three-dimensional motion estimates as part of training a machine-learned feature extraction model according to example embodiments of the present disclosure. One or more portions of a method 1000 can be implemented by one or more devices (e.g., one or more computing devices) or systems including, for example, the operations computing system 104, the vehicle 108, or the vehicle computing system 112, shown in FIG. 1. Moreover, one or more portions of the method 1000 can be implemented as an algorithm on the hardware components of the devices described herein (e.g., as in FIG. 1) to, for example, generate outputs including estimated motion flow of objects in an environment based on representations of the environment from different perspectives. In some embodiments, one or more portions of the method 900 can be performed as part of the method 800 that is depicted in FIG. 8. Further, one or more portions of the method 900 can be performed as part of determining one or more three-dimensional motion estimates of one or more object instances that are predicted to occur over a second set of time intervals subsequent to the first set of time intervals based at least in part on the plurality of energy functions and one or more machine-learned inference models as described in 808 of the method 800. FIG. 10 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 1002, the method 1000 can include determining an energy associated with a photometric error based at least in part on one or more comparisons of one or more portions of each of the plurality of representations at an initial time interval to one or more portions of each of the plurality of representations at a time interval subsequent to the initial time interval. For example, the operations computing system 104 can determine photometric error based at least in part on analysis of differences between overlapping or non-overlapping patches of the plurality of representations at different time intervals. The photometric error can be positively correlated with greater differences between patches of the plurality of representations such that the error is greater when there are more differences and/or a greater magnitude of differences between patches of the plurality of representations at different time intervals.

In some embodiments, each representation of the plurality of representations can include a plurality of pixels. For example, the plurality of representations can include one or more images, each of which can be a raster or vector image. Further, the disparity between the representations at the initial time interval and the time interval subsequent to the initial time interval can based at least in part on one or more differences between the plurality of pixels of the representation of the plurality of representations at the initial time interval and the representation at the time interval subsequent to the initial time interval. For example, the one or more differences can include differences in the intensity of pixel values that can be compared to a threshold value that can be used to determine if the disparity is sufficient for the respective pixels to be excluded.

At 1004, the method 1000 can include determining an energy associated with rigid motion error based at least in part on similarity of one or more optical flow motion estimates of the one or more object instances to one or more stereo motion estimates of the one or more object instances. The energy can be negatively correlated with similarity between the one or more optical flow motion estimates of the one or more object instances and the one or more stereo motion estimates of the one or more object instances. For example, greater similarity of the one or more optical flow motion estimates of the one or more object instances to the one or more stereo motion estimates of the one or more object instances can result in greater minimization of the energy associated with rigid motion error. By way of example, the operations computing system 104 can determine the energy associated with rigid motion error based in part on one or more comparisons of the one or more optical flow motion estimates of the one or more object instances to the one or more stereo motion estimates of the one or more object instances.

At 1006, the method 1000 can include determining an energy associated with flow consistency based at least in part on a two-dimensional rigid flow and an optical flow of one or more portions of the plurality of extracted visual cues. For example, the operations computing system 104 can determine a projection of the three-dimensional motion of the one or more object instances that are most similar to an estimated flow associated with the one or more three-dimensional motion estimates of the one or more object instances.

At 1008, the method 1000 can include minimizing the energy based at least in part on a weighted combination of photometric error, rigid motion error, and flow consistency associated with the plurality of representations. For example, the operations computing system 104 can determine the energy by determining the rigid three-dimensional motion of the one or more object instances that results in a lower photometric error, lower rigid motion error, and/or greater flow consistency.

In some embodiments, minimizing the energy can be based at least in part on performing one or more operations associated with a Gaussian-Newton solver. For example, the operations computing system 104 can minimize the energy by performing one or more operations to iteratively minimize a least-squared function associated with rigid motion of the one or more object instances over the first set of time intervals.

FIG. 11 depicts a diagram of examples of machine-learned feature-extraction models and machine-learned inference models according to example embodiments of the present disclosure. One or more portions of the machine-learned models 1100 can be stored, executed, and/or implemented on one or more devices (e.g., one or more computing devices) or systems including, for example, the operations computing system 104, the vehicle 108, or the vehicle computing system 112, shown in FIG. 1. Moreover, one or more portions of the machine-learned models 1100 can be implemented as an algorithm on the hardware components of the devices described herein (e.g., as in FIG. 1) to, for example, generate outputs including estimated motion flow of objects in an environment based on representations of the environment from different perspectives.

As shown in FIG. 11, the machine-learned models 1100 include a plurality of machine-learned feature extraction models 1110, one or more segmentation models 1120, one or more stereo matching models 1130, one or more optical flow models 1140, one or more machine-learned inference models 1150, photometric error energy operations 1160, rigid motion energy operations 1170, flow consistency energy operations 1180, and a Gaussian-Newton solver 1190.

The plurality of machine-learned feature extraction models 1110 can use any combination of the one or more segmentation models 1120, the one or more stereo matching models 1130, and/or the one or more optical flow models 1140. Further, the one or more machine-learned inference models 1150 can use any combination of the photometric energy term 1160, the rigid motion energy operations 1170, the flow consistency energy operations 1180, and/or the Gaussian-Newton solver 1190. Further, the plurality of machine-learned feature extraction models 1110 can include any of the attributes and/or capabilities of the plurality machine-learned feature extraction models described herein including the plurality of machine-learned feature extraction models described in the methods 300-1000 that are depicted in FIGS. 3-10.

In some embodiments, the plurality of machine-learned feature extraction models 1110 and/or the one or more machine-learned inference models 1150 can include and/or be associated with on one or more neural networks. The one or more neural networks can include one or more layers, each of which can include input nodes, output nodes, and/or intermediate nodes between the input nodes and output nodes. Further, the plurality of machine-learned feature extraction models 1110 can include any of the layers of the one or more segmentation models 1120, the one or more stereo matching models 1130, and/or the one or more optical flow models 1140.

In some embodiments, the plurality of machine-learned feature extraction models 1110 can be configured and/or trained to generate one or more estimates based at least in part on a plurality of representations of an environment. Further, the one or more estimates can include one or more object instance segment estimates, one or more optical flow motion estimates, and/or one or more stereo motion estimates which are described herein.

In some embodiments, the one or more machine-learned inference models 1150 can be configured and/or trained to generate one or more three-dimensional motion estimates based at least in part on minimization of energy associated with the plurality of representations. Further, the one or figured to minimize energy associated with at least one of a photometric error, a rigid motion error, and/or a flow consistency. For example, the one or more machine-learned inference models 1150 can minimize the energy associated with the photometric error, the rigid motion error, and the flow consistency by performing any of the photometric error energy operations 1160, the rigid motion energy operations 1170, and/or the flow consistency energy operations 1180.

In some embodiments, the one or more machine-learned inference models 1150 can perform the photometric error energy operations 1160 which can use the photometric error function: $E_{photo,i}(\xi_i; I) = \Sigma_{p \in P_i} \alpha_p \rho(\mathcal{L}^0(p) - \mathcal{L}^0(p'))$. The photometric error $E_{photo,i}(\xi_i; I)$ for an instance $\xi i$ of a plurality of inputs I corresponding to a plurality of representations, in which $\Sigma_{p \in P_i}$ represents each pixel of a plurality of pixels in a representation; $\alpha_p \rho$ represents an indicator function indicating which pixel is an outlier; and ($\mathcal{L}^0(p) - \mathcal{L}^0(p')$) represents differences between the pixels of a plurality of representations from one perspective (e.g., a left stereo perspective) over two consecutive time intervals. The photometric error function can be used as part of minimizing the energy associated with photometric error.

The one or more machine-learned inference models 1150 can perform the rigid motion energy operations 1170 which can use the rigid motion function: $E_{rigid,i}(\xi_i; I) = \Sigma_{(p,q)} \alpha_p \rho(\xi^\circ \pi_K^{-1}(p, \mathcal{D}^0(p)) - \pi_K^{-1}(q, \mathcal{D}^1(q)))$ in which q and $\pi_K^{-1}$ represent the inverse projection function and p represents a robust error function. The rigid motion function can be used as part of minimizing the energy associated with rigid motion.

The one or more machine-learned inference models 1150 can perform the flow consistency energy operations 1180 which can use the flow consistency function:

$$E_{flow,i}(\xi_i; I) = \sum_{p \in P_i} \rho( \underbrace{(p' - p)}_{\text{2D Rigid flow}} - \underbrace{\mathcal{F}_\mathcal{L}(p)}_{\text{optical flow}} )$$

in which (ṕ-p) represents two-dimensional rigid flow; and $\mathcal{F}_\mathcal{L}(p)$ represents optical flow. The flow consistency function can be used as part of minimizing the energy associated with flow consistency.

In some embodiments, the Gaussian-Newton solver 1190 can be implemented as a discrete entity or as a layer of the one or more machine-learned models. In some embodiments, the Gaussian-Newton solver 1190 can be a implemented as a machine-learned model that is configured and/or trained to receive an input (e.g., the plurality of extracted visual cues); perform one or more operations including iteratively minimizing a least-squared function associated with rigid motion of the one or more object instances over the first set of time intervals; and generating an output including one or more three-dimensional motion estimates.

Figure 12:
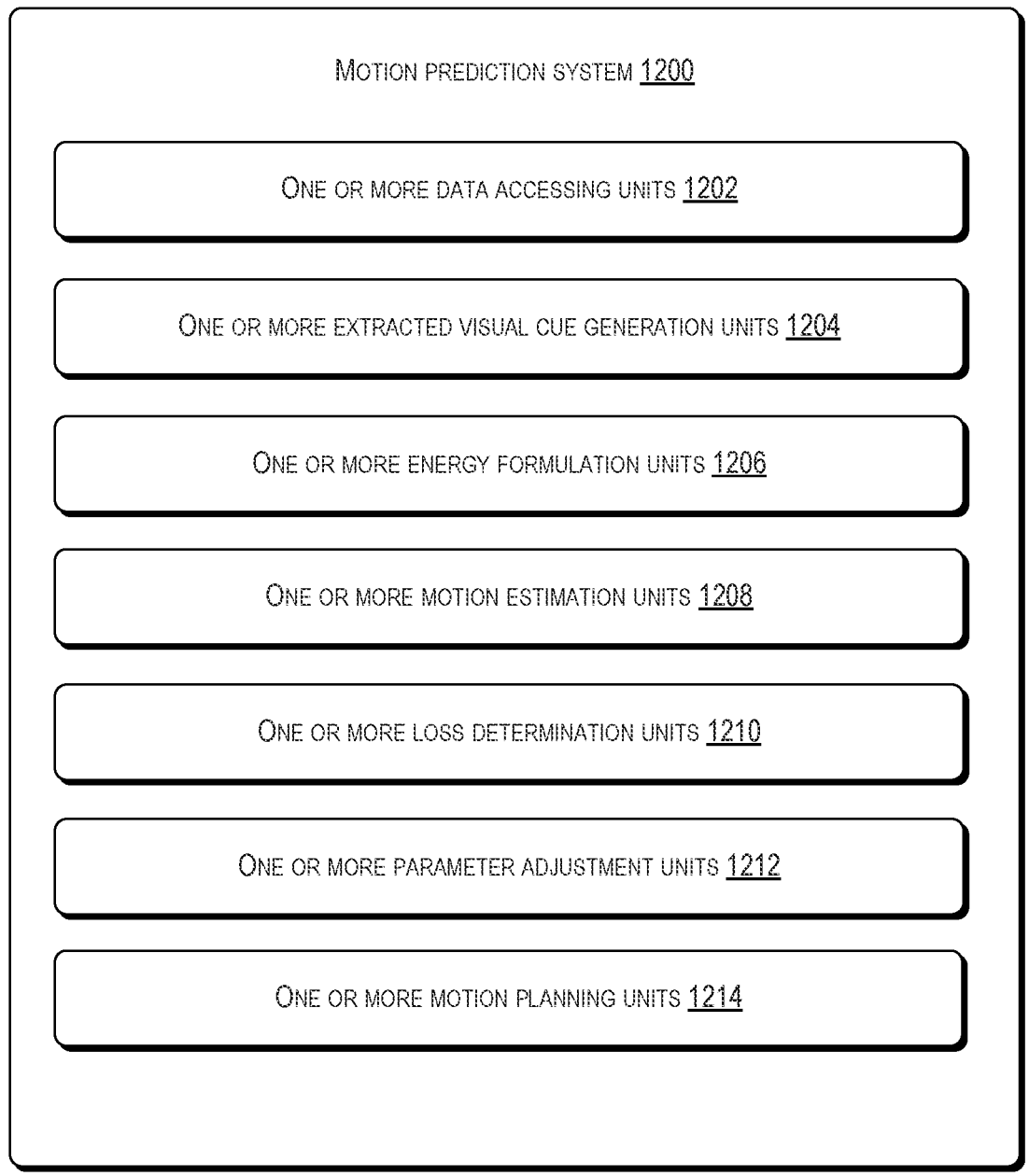
FIG. 12 depicts a diagram of an example system according to example embodiments of the present disclosure.

FIG. 12 depicts an example of a motion estimation system according to example embodiments of the present disclosure. One or more operations and/or functions in FIG. 12 can be implemented and/or performed by one or more devices (e.g., one or more computing devices) or systems including, for example, the operations computing system 104, the vehicle 108, or the vehicle computing system 112, which are shown in FIG. 1. Further, the one or more devices and/or systems in FIG. 12 can include one or more features of one or more devices and/or systems including, for example, the operations computing system 104, the vehicle 108, or the vehicle computing system 112, which are depicted in FIG. 1.

Various means can be configured to perform the methods and processes described herein. For example, a motion estimation system 1200 can include one or more data accessing units 1202, one or more extracted visual cue generation units 1204, one or more energy formulation units 1206, one or more motion estimation units 1208, one or more loss determination units 1210, one or more parameter adjustment units 1212, one or more motion planning units 1214, and/or other means for performing the operations and functions described herein. In some implementations, one or more of the units may be implemented separately. In some implementations, one or more units may be a part of, or included in, one or more other units. These means can include one or more processors, one or more microprocessors, one or more graphics processing units, one or more logic circuits, one or more dedicated circuits, one or more application-specific integrated circuits (ASICs), programmable array logic, one or more field-programmable gate arrays (FPGAs), one or more controllers, one or more microcontrollers, and/or other suitable hardware. The means can also, or alternately, include software control means implemented with a processor or logic circuitry for example. The means can include or otherwise be able to access memory including, for example, one or more non-transitory computer-readable storage media, such as random-access memory, read-only memory, electrically erasable programmable read-only memory, erasable programmable read-only memory, one or more flash/other memory devices, one or more data registrars, one or more databases, and/or other suitable hardware.

The means can be programmed (e.g., an FPGA custom programmed to operate a motion estimation system) or configured (e.g., an ASIC custom designed and configured to operate a motion estimation system) to perform one or more algorithms for performing the operations and functions described herein. For example, the means (e.g., the one or more data accessing units 1202) can be configured to access scene data including a plurality of representations of an environment over a first set of time intervals.

In some implementations, the one or more data accessing units 1202 can be configured to access training data including a plurality of representations of an environment over a first set of time intervals. The plurality of representations can include a first plurality of representations of the environment from a first perspective and a second plurality of representations from a second perspective.

The means (e.g., the one or more extracted visual cue generation units 1204) can be configured to generate a plurality of extracted visual cues based at least in part on a plurality of representations and a plurality of machine-learned feature extraction models. In some embodiments, at least one of the plurality of machine-learned feature extraction models can be configured to generate a portion of the plurality of extracted visual cues based at least in part on a first set of the plurality of representations of the environment from a first perspective and a second set of the plurality of representations of the environment from a second perspective.

In some embodiments, the plurality of machine-learned feature extraction models can include: a machine-learned segmentation model configured and/or trained to determine the portion of the plurality of extracted visual cues including one or more object instance segments associated with the plurality of representations; a machine-learned stereo matching model configured and/or trained to determine the portion of the plurality of extracted visual cues including one or more depth estimates associated with the plurality of representations; and/or a machine-learned optical flow model configured and/or trained to determine the portion of the plurality of extracted visual cues including an optical flow associated with the plurality of representations. In some embodiments, the plurality of machine-learned feature extraction models are trained to extract one or more visual cues from the plurality of representations. Further, the plurality of visual cues can include one or more instance segmentation cues, one or more optical flow cues, and/or one or more stereo cues. In some embodiments, the machine-learned stereo matching model can be configured and/or trained to determine the one or more depth estimates associated with the plurality of representations based at least in part on the first set of the plurality of representations and the second set of the plurality of representations.

In some embodiments, the plurality of machine-learned feature extraction models can be configured and/or trained to generate one or more estimates based at least in part on a plurality of representations of an environment. The one or more estimates can include one or more object instance segment estimates, one or more optical flow motion estimates, and one or more stereo motion estimates. Furthermore, in some embodiments, the one or more machine-learned inference models can be configured and/or trained to generate one or more three-dimensional motion estimates based at least in part on minimization of energy associated with the plurality of representations. The one or more machine-learned inference models are configured to minimize energy associated with at least one of a photometric error, a rigid motion error, and a flow consistency. In some embodiments, the photometric error can be based at least in part on a similarity of the plurality of representations over time, the rigid motion error can be based at least in part on one or more differences between the one or more flow motion estimates and the one or more stereo motion estimates, and the flow consistency can be based at least in part on one more two-dimensional rigid flow estimates with respect to the one or more optical flow motion estimates.

In some embodiments, the one or more extracted visual cue generation units 1204 can be configured to determine one or more object instance proposals associated with the plurality of representations; determine an object class for each of the one or more object instance proposals; and/or determine a background-foreground segmentation mask for each of the one or more object instance proposals. In some embodiments, a portion of the plurality of extracted visual cues can be based at least in part on the one or more object instance proposals.

In some embodiments, the one or more extracted visual cue generation units 1204 can be configured to generate a feature map based at least in part on the plurality of representations; determine a cost volume of the feature map based at least in part on an aggregation of context in different scales and/or different locations of the feature map; and/or determine one or more depth estimates for the plurality of representations based at least in part on aggregation of the cost volume.

In some embodiments, the one or more extracted visual cue generation units 1204 can be configured to determine one or more features of the plurality of representations that have a large context; warp the one or more features based at least in part on a coarse to fine scheme; and/or sharpen one or more boundaries of the one or more features.

In some embodiments, the one or more extracted visual cue generation units 1204 can be configured to determine one or more visual features of the one or more features based at least in part on a size of each visual feature of the one or more visual features; and warp the one or more visual features based at least in part on the size of each visual feature of the one or more visual features. The one or more visual features that are relatively larger are progressively warped before the one or more visual features that are relatively smaller.

In some embodiments, the one or more extracted visual cue generation units 1204 can be configured to determine one or more portions of the plurality of representations that are occluded based at least in part on a disparity between a representation of the plurality of representations at an initial time interval and the representation at a time interval subsequent to the initial time interval; and determine that the one or more portions of the plurality of representations that are occluded are excluded from the plurality of extracted visual cues. Each of the plurality of representations can include a plurality of pixels. Further, the disparity can be based at least in part on one or more differences between the plurality of pixels of the representation of the plurality of representations at the initial time interval and the representation at the time interval subsequent to the initial time interval.

The means (e.g., the one or more energy formulation generation units 1206) can be configured to encode the plurality of extracted visual cues using a plurality of energy functions.

The means (e.g., the one or more motion estimation units 1208) can be configured to determine one or more three-dimensional motion estimates of one or more object instances over a second set of time intervals based at least in part on the plurality of energy functions and one or more machine-learned inference models. In some embodiments, the second set of time intervals can be subsequent to the first set of time intervals.

In some embodiments, the one or more one or more estimated location determination units 1208 can be configured to determine an energy associated with a photometric error based at least in part on one or more comparisons of one or more portions of each of the plurality of representations at an initial time interval to one or more portions of each of the plurality of representations at a time interval subsequent to the initial time interval.

In some embodiments, the one or more one or more estimated location determination units 1208 can be configured to determining an energy associated with rigid motion based at least in part on a similarity of the one or more optical flow motion estimates for the one or more object instances to the one or more stereo motion estimates for the one or more object instances. In some embodiments, the energy can be negatively correlated with the amount of similarity.

In some embodiments, the one or more one or more energy formulation units 1208 can be configured to determine an energy associated with flow consistency based at least in part on a two-dimensional rigid flow and an optical flow of one or more portions of the plurality of energy functions.

The means (e.g., the one or more loss determination units 1210) can be configured to determine a loss associated with one or more comparisons of the one or more three-dimensional motion estimates of the one or more object instances relative to one or more ground-truth locations of the one or more object instances.

In some embodiments, the one or more loss determination units 1210 can be configured to minimize a weighted combination of energies associated with the plurality of representations. The energies can include an energy associated with photometric error, an energy associated with rigid motion error, and an energy associated with flow consistency. Further, minimizing the weighted combination of energies can be based at least in part on performing one or more operations using a Gaussian-Newton solver.

The means (e.g., the one or more parameter adjustment units 1212) can be configured to adjusting one or more parameters of the plurality of machine-learned feature extraction models based at least in part on the loss.

The means (e.g., the one or more motion planning units 1214) can be configured to determine a motion plan for a vehicle based at least in part on the one or more three-dimensional motion estimates of the one or more object instances. The motion plan can include one or more locations for the vehicle that do not traverse the one or more three-dimensional motion estimates of the one or more object instances.

Figure 13:
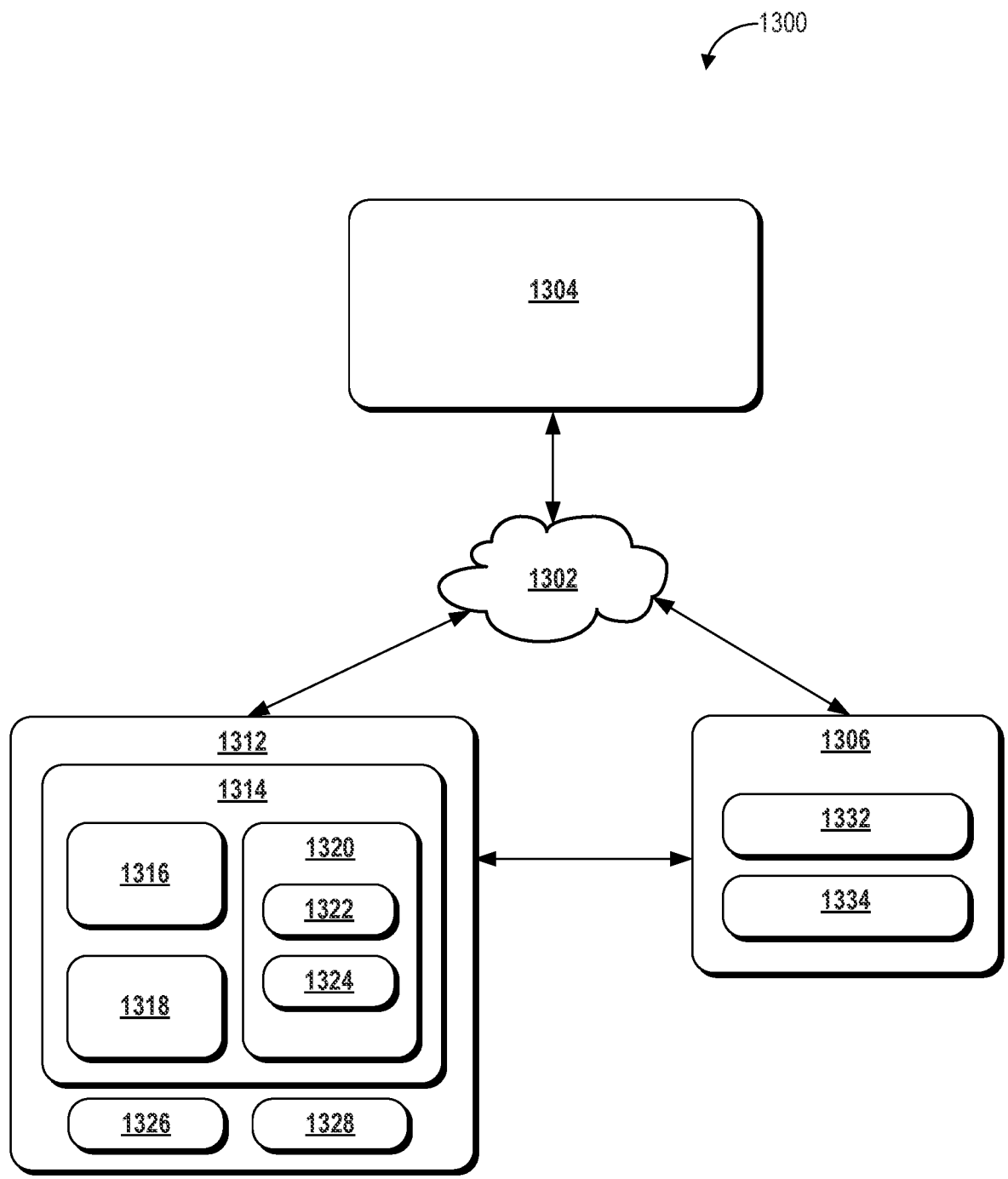
FIG. 13 depicts a diagram of an example system according to example embodiments of the present disclosure.

FIG. 13 depicts a diagram of an example system according to example embodiments of the present disclosure. A system 1300 can include a network 1302 which can include one or more features of the communications network 102 depicted in FIG. 1; an operations computing system 1304 which can include one or more features of the operations computing system 104 depicted in FIG. 1; one or more remote computing devices 1306 which can include one or more features of the one or more remote computing devices 106 depicted in FIG. 1; a vehicle computing system 1312 which can include one or more features of the vehicle computing system 112 depicted in FIG. 1; one or more computing devices 1314; a communication interface 1316; one or more processors 1318; one or more memory devices 1320; memory system 1322; memory system 1324; one or more input devices 1326; one or more output devices 1328; one or more input devices 1332; and one or more output devices 1334.

The vehicle computing system 1312 can include the one or more computing devices 1314. The one or more computing devices 1314 can include one or more processors 1318 which can be included on-board a vehicle including the vehicle 108 and one or more memory devices 1320 which can be included on-board a vehicle including the vehicle 108. The one or more processors 1318 can include any processing device including a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs), and/or processing units performing other specialized calculations. The one or more processors 1318 can include a single processor or a plurality of processors that are operatively and/or selectively connected. The one or more memory devices 1320 can include one or more non-transitory computer-readable storage media, such as RAM, ROM, EEPROM, EPROM, flash memory devices, magnetic disks, and/or combinations thereof.

The one or more memory devices 1320 can store data or information that can be accessed by the one or more processors 1318. For instance, the one or more memory devices 1320 which can be included on-board a vehicle including the vehicle 108, can include a memory system 1322 that can store computer-readable instructions that can be executed by the one or more processors 1318. The memory system 1322 can include software written in any programming language that can be implemented in hardware (e.g., computing hardware). Further, the memory system 1322 can include instructions that can be executed in logically and/or virtually separate threads on the one or more processors 1318. The memory system 1322 can include any set of instructions that when executed by the one or more processors 1318 cause the one or more processors 1318 to perform operations.

For example, the one or more memory devices 1320 which can be included on-board a vehicle (e.g., the vehicle 108) can store instructions, including specialized instructions, that when executed by the one or more processors 1318 on-board the vehicle cause the one or more processors 1318 to perform operations such as any of the operations and functions of the one or more computing devices 1314 or for which the one or more computing devices 1314 are configured, including any of the operations performed by the vehicle computing system 112 and/or any other operations and/or functions for operation of a vehicle, as described in the present disclosure.

The one or more memory devices 1320 can include a memory system 1324 that can store data that can be retrieved, manipulated, created, and/or stored by the one or more computing devices 1314. The data stored in memory system 1324 can include, for instance, the scene data and/or training data that are described herein including in the methods 300-1000 that are depicted in FIGS. 3-10 respectively. Furthermore, the data stored in the memory system 1324 can include one or more machine-learned models that have been configured and/or trained to generate an output based at least in part on an input provided to the one or more machine-learned models. For example, the one or more machine-learned models stored in the memory system 1324 can include one or more convolutional neural networks, one or more residual convolutional neural networks, one or more recurrent neural networks, and/or one or more recursive neural networks. Further, the one or more machine-learned models stored in the memory system 1324 can include one or more machine-learned feature extraction models, one or more machine-learned segmentation models, one or more machine-learned stereo matching models, one or more optical flow, and/or one or more machine-learned inference models, which are described herein including in the methods 300-1000 that are depicted in FIGS. 3-10.

The data that is stored in the memory system 1324 can also include data associated with one or more states of one or more objects detected by one or more sensors (e.g., the one or more sensors 114 of the vehicle 108 that is described in the method 100 that is depicted in FIG. 1); data associated with one or more states of a device associated with the operations and/or functions of the vehicle computing system 1312, the operations computing system 1304, and/or the one or more remote computing devices 1306; data generated by any of the computing systems (e.g., the vehicle computing system 112) and/or computing devices involved in the determination of one or more three-dimensional motion estimates as described in the method 300 that is depicted in FIG. 3; data associated with user input; data associated with one or more actions and/or control command signals; data associated with users; and/or other data or information. The data in the memory system 1324 can be stored in one or more databases. The one or more databases can be split up so that the one or more databases are located in multiple locales on-board a vehicle which can include the vehicle 108. In some implementations, the one or more computing devices 1314 can obtain data from one or more memory devices that are remote from a vehicle, including, for example the vehicle 108.

The system 1300 can include the network 1302 (e.g., a communications network) which can be used to send and/or receive signals (e.g., electronic signals) or data (e.g., data from a computing device) including signals or data exchanged between computing devices including the operations computing system 1304, the one or more remote computing devices 1306, and/or the vehicle computing system 1312. The network 1302 can include any combination of various wired (e.g., twisted pair cable) and/or wireless communication mechanisms (e.g., cellular, wireless, satellite, microwave, and radio frequency) and/or any desired network topology (or topologies). For example, the communications network 1302 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from a vehicle including the vehicle 108.

The one or more computing devices 1314 can also include the communication interface 1316 used to communicate with one or more other systems which can be included on-board a vehicle including the vehicle 108 (e.g., over the network 1302). The communication interface 1316 can include any suitable components for interfacing with one or more networks, including for example, transmitters, receivers, ports, controllers, antennas, other hardware and/or software.

The vehicle computing system 1312 can also include one or more input devices 1326 and/or one or more output devices 1328. The one or more input devices 1326 and/or the one or more output devices 1328 can be included and/or otherwise associated with a human-machine interface system. The one or more input devices 1326 can include, for example, hardware for receiving information from a user, such as a touch screen, touch pad, mouse, data entry keys, speakers, and/or a microphone suitable for voice recognition. The one or more output devices 1328 can include one or more display devices (e.g., display screen, CRT, LCD) and/or one or more audio output devices (e.g., loudspeakers). The display devices and/or the audio output devices can be used to facilitate communication with a user. For example, a human operator (e.g., associated with a service provider) can communicate with a current user of a vehicle including the vehicle 108 via at least one of the display devices and the audio output devices.

The operations computing system 1304 can include one or more computing devices configured to perform one or more operations associated with operating one or more services. The one or more services can include one or more transportation services, courier services, and/or delivery services. Furthermore, the operations computing system 1304 can include one or more processors and one or more memory devices that can be used to store data including the scene data, the training data, and/or the one or more machine-learned models that are stored in the memory system 1324.

The one or more remote computing devices 1306 can include various types of computing devices. For example, the one or more remote computing devices 1306 can include a phone, a smart phone, a tablet, a personal digital assistant (PDA), a laptop computer, a computerized watch (e.g., a smart watch), computerized eyewear, computerized headwear, other types of wearable computing devices, a gaming system, a media player, an e-book reader, and/or other types of computing devices. The one or more remote computing devices 1306 can be associated with a user. The one or more remote computing devices 1306 described herein can also be representative of a user device that can be included in the human machine interface system of a vehicle including the vehicle 108.

The one or more remote computing devices 1306 can include one or more input devices 1332 and/or one or more output devices 1334. The one or more input devices 1332 can include, for example, hardware for receiving information from a user, such as a touch screen, touch pad, mouse, data entry keys, speakers, and/or a microphone suitable for voice recognition. The one or more output devices 1334 can include hardware for providing content for display. For example, the one or more output devices 1334 can include a display device (e.g., display screen, CRT, LCD), which can include hardware for a user interface.

Furthermore, the one or more remote computing devices 1306 can include one or more processors and one or more memory devices which can be used to store data including the scene data, the training data, and/or the one or more machine-learned models that are stored in the memory system 1324.

The technology discussed herein makes reference to computing devices, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, computer-implemented processes discussed herein can be implemented using a single computing device or multiple computing devices working in combination. Databases and applications can be implemented on a single system or distributed across multiple systems. Distributed components can operate sequentially or in parallel.

Furthermore, computing tasks discussed herein as being performed at computing devices remote from the vehicle (e.g., the operations computing system and its associated computing devices) can instead be performed at the vehicle (e.g., via the vehicle computing system). Such configurations can be implemented without deviating from the scope of the present disclosure.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method comprising:
   accessing a first pair of stereo images and a second pair of stereo images of an environment of an autonomous vehicle from a pair of stereo cameras, wherein the first pair of stereo images comprises a first image of the environment from a first perspective at a first time and a second image of the environment from a second perspective at the first time, wherein the second pair of stereo images comprise a first image of the environment from the first perspective at a second time and a second image of the environment from the second perspective at the second time;
   generating, in less than 10 seconds, a three-dimensional motion estimate for an object in the environment using a machine-learned motion flow model by:
      determining, using the machine-learned motion flow model, a plurality of extracted features from the first pair of stereo images and the second pair of stereo images, wherein at least one feature of the plurality of features describes an object instance associated with an object in the environment; and processing, using the machine-learned motion flow model, the plurality of extracted features, wherein the machine-learned motion flow model is configured to solve an energy optimization function for characterizing three-dimensional rigid motion of the object instance; and controlling a motion of the autonomous vehicle based on the three-dimensional motion estimate.

2. The computer-implemented method of claim 1, wherein the three-dimensional motion estimate is generated in less than 1 second.

3. The computer-implemented method of claim 2, wherein processing, using the machine-learned motion flow model, the plurality of extracted features comprises:
executing a solver to optimize, over a plurality of steps, one or more energy terms associated with motion of the object instance;
wherein the solver executes in less than 1 second.

4. The computer-implemented method of claim 1, wherein the machine-learned motion flow model comprises a machine-learned segmentation model.

5. The computer-implemented method of claim 4, wherein the machine-learned segmentation model is configured to associate the object instance with a portion of at least one of the first pair of stereo images and the second pair of stereo images.

6. The computer-implemented method of claim 1, wherein the machine-learned motion flow model is trained end-to-end.

7. The computer-implemented method of claim 1, wherein the plurality of extracted features from the first pair of stereo images and the second pair of stereo images comprise one or more visual cues, the one or more visual cues comprising at least one of an instance segmentation cue, an optical flow cue, or a stereo cue.

8. The computer-implemented method of claim 1, wherein the machine-learned motion flow model is configured to solve the energy optimization function using a Gaussian-Newton (GN) algorithm implemented as layers in a neural network.

9. The computer-implemented method of claim 1, the method further comprising:
removing uncertain pixels from the plurality of extracted features before processing the plurality of extracted features with the machine-learned motion flow model.

10. A computing system comprising:
one or more processors; and
one or more tangible non-transitory computer readable media storing computer-readable instructions that are executable by the one or more processors to cause the one or more processors to perform operations, the operations comprising:
accessing a first pair of stereo images and a second pair of stereo images of an environment of an autonomous vehicle from a pair of stereo cameras, wherein the first pair of stereo images comprises a first image of the environment from a first perspective at a first time and a second image of the environment from a second perspective at the first time, wherein the second pair of stereo images comprise a first image of the environment from the first perspective at a second time and a second image of the environment from the second perspective at the second time;

generating, in less than 10 seconds, a three-dimensional motion estimate for an object in the environment using a machine-learned motion flow model by:
determining, using the machine-learned motion flow model, a plurality of extracted features from the first pair of stereo images and the second pair of stereo images, wherein at least one feature of the plurality of features describes an object instance associated with an object in the environment; and
processing, using the machine-learned motion flow model, the plurality of extracted features, wherein the machine-learned motion flow model is configured to solve an energy optimization function for characterizing three-dimensional rigid motion of the object instance; and
controlling a motion of the autonomous vehicle based on the three-dimensional motion estimate.

11. The computing system of claim 10, wherein the three-dimensional motion estimate is generated in less than 1 second.

12. The computing system of claim 10, wherein the plurality of extracted features from the first pair of stereo images and the second pair of stereo images comprise one or more visual cues, the one or more visual cues comprising at least one of an instance segmentation cue, an optical flow cue, or a stereo cue.

13. The computing system of claim 10, wherein processing, using the machine-learned motion flow model, the plurality of extracted features comprises:
executing a solver to optimize, over a plurality of steps, one or more energy terms associated with motion of the object instance;
wherein the solver executes in less than 1 second.

14. The computing system of claim 13, wherein the plurality of steps are implemented as a plurality of layers of a neural network.

15. The computing system of claim 14, comprising:
a graphical processing unit (GPU);
wherein the operations comprise:
executing the layers of the neural network on the GPU.

16. The computing system of claim 10, wherein the machine-learned motion flow model is trained end-to-end.

17. The computing system of claim 10, wherein the pair of stereo cameras is configured to obtain the first pair of stereo images and the second pair of stereo images of an environment associated with an augmented reality system.

18. One or more tangible non-transitory computer readable media storing computer-readable instructions that are executable by one or more processors to cause the one or more processors to perform operations, the operations comprising:
accessing a first pair of stereo images and a second pair of stereo images of an environment of an autonomous vehicle from a pair of stereo cameras, wherein the first pair of stereo images comprises a first image of the environment from a first perspective at a first time and a second image of the environment from a second perspective at the first time, wherein the second pair of stereo images comprise a first image of the environment from the first perspective at a second time and a second image of the environment from the second perspective at the second time;
generating, in less than 10 seconds, a three-dimensional motion estimate for an object in the environment using a machine-learned motion flow model by:
determining, using the machine-learned motion flow model, a plurality of extracted features from the first pair of stereo images and the second pair of stereo images, wherein at least one feature of the plurality of features describes an object instance associated with an object in the environment; and processing, using the machine-learned motion flow model, the plurality of extracted features, wherein the machine-learned motion flow model is configured to solve an energy optimization function for characterizing three-dimensional rigid motion of the object instance; and controlling a motion of the autonomous vehicle based on the three-dimensional motion estimate.

19. The computer-implemented method of claim 3, wherein the plurality of steps are implemented as a plurality of layers of a neural network.

20. The computer-implemented method of claim 19, comprising:

executing the layers of the neural network on a graphical processing unit (GPU).

* * * * *